United States Patent
Junk et al.

(10) Patent No.: US 10,240,687 B2
(45) Date of Patent: Mar. 26, 2019

(54) METHODS AND APPARATUS OF TESTING A SOLENOID VALVE OF AN EMERGENCY VALVE VIA A POSITIONER

(71) Applicant: Fisher Controls International LLC, Marshalltown, IA (US)

(72) Inventors: Kenneth Junk, Marshalltown, IA (US); Shannon Jelken, Marshalltown, IA (US); Jimmie Snowbarger, Marshalltown, IA (US); Bruce Grumstrup, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 198 days.

(21) Appl. No.: 15/298,731

(22) Filed: Oct. 20, 2016

(65) Prior Publication Data

US 2018/0112798 A1   Apr. 26, 2018

(51) Int. Cl.
*F16K 31/02* (2006.01)
*F16K 37/00* (2006.01)
(Continued)

(52) U.S. Cl.
CPC ........ *F16K 37/0091* (2013.01); *F15B 19/005* (2013.01); *F16K 11/044* (2013.01); *F16K 31/0627* (2013.01); *F16K 37/0041* (2013.01)

(58) Field of Classification Search
CPC ............. F16K 37/0091; F16K 37/0025; F16K 11/0716; F16K 27/003; F16K 31/0613;
(Continued)

(56) References Cited

U.S. PATENT DOCUMENTS 3,829,842 A   8/1974   Langdon et al.
4,428,223 A   1/1984   Trevisan
(Continued)

FOREIGN PATENT DOCUMENTS

WO   2014197422   12/2014

OTHER PUBLICATIONS

Emerson Process Management, "Fisher FIELDVUE™ DVC6200 Digital Valve Controller—Instruction Manual D103409X012," Fisher Controls International LLC, Dec. 2013, 148 pages.
(Continued)

*Primary Examiner* — Minh Q Le
(74) *Attorney, Agent, or Firm* — Hanley, Flight & Zimmerman, LLC

(57) ABSTRACT

Methods and apparatus of testing a solenoid valve of an emergency valve via a positioner are disclosed. An example method includes conducting a solenoid valve test by initiating a pulse duration and a monitoring duration for the solenoid valve test. Conducting the solenoid valve test further includes instructing a solenoid valve to transition from a first state to a second state during the pulse duration. The solenoid valve is in fluid communication with an actuator to enable the actuator to actuate an emergency valve. Conducting the solenoid valve test further includes determining a functionality of the solenoid valve by measuring, via a valve positioner, a maximum pressure change of a pressure chamber of the actuator during the monitoring duration. The example method includes, upon determining the solenoid valve is in a functioning state, conducting a partial stroke test of the emergency valve via the valve positioner.

21 Claims, 11 Drawing Sheets

(51) Int. Cl.
*F15B 19/00* (2006.01)
*F16K 11/044* (2006.01)
*F16K 31/06* (2006.01)

(58) Field of Classification Search
CPC ......... G05D 7/0635; F15D 2211/50536; F15D 13/0426
USPC ....... 137/487.5, 485, 596.13, 596.15, 596.18
See application file for complete search history.

(56) References Cited

U.S. PATENT DOCUMENTS

| | | | |
|---|---|---|---|
| 4,556,959 A | 12/1985 | Dickenson et al. | |
| 4,557,136 A | 12/1985 | Greenhalf | |
| 5,197,328 A | 3/1993 | Fitzgerald | |
| 5,329,956 A * | 7/1994 | Marriott | F16K 17/04 137/15.01 |
| 5,558,115 A | 9/1996 | Lenz et al. | |
| 5,573,032 A | 11/1996 | Lenz et al. | |
| 6,119,515 A | 9/2000 | Kemmler et al. | |
| 6,176,247 B1 | 1/2001 | Winchcomb et al. | |
| 6,186,167 B1 | 2/2001 | Grumstrup et al. | |
| 6,862,547 B2 * | 3/2005 | Snowbarger | G05B 9/02 702/114 |
| 6,920,409 B2 | 7/2005 | Essam | |
| 6,954,683 B2 | 10/2005 | Junk et al. | |
| 7,464,721 B2 | 12/2008 | Perry et al. | |
| 7,609,056 B2 | 10/2009 | Junk et al. | |
| 7,621,293 B2 | 11/2009 | Snowbarger | |
| 7,925,386 B2 | 4/2011 | Krippner et al. | |
| 8,074,512 B2 * | 12/2011 | Al-Buaijan | F15B 19/005 73/168 |
| 8,104,495 B2 | 1/2012 | Snowbarger | |
| 8,479,734 B2 | 7/2013 | Wood | |
| 8,540,211 B2 | 9/2013 | Wheater et al. | |
| 8,684,021 B2 | 4/2014 | Snowbarger | |
| 8,725,434 B2 | 5/2014 | Flanders | |
| 8,996,328 B2 | 3/2015 | Snowbarger | |
| 9,046,185 B2 | 6/2015 | Kiesbauer et al. | |
| 9,255,649 B2 | 2/2016 | Coleman et al. | |
| 9,551,434 B1 | 1/2017 | Hung | |
| 9,611,873 B2 | 4/2017 | Junk | |
| 9,752,599 B2 | 9/2017 | Junk | |
| 9,874,870 B2 | 1/2018 | Law et al. | |
| 10,041,610 B2 | 8/2018 | Junk et al. | |
| 2002/0108436 A1 * | 8/2002 | Albuaijan | F16K 37/0083 73/168 |
| 2003/0062494 A1 | 4/2003 | Snowbarger et al. | |
| 2005/0016254 A1 * | 1/2005 | Brown | F16K 37/0091 73/1.17 |
| 2006/0219299 A1 * | 10/2006 | Snowbarger | F16K 37/0091 137/487.5 |
| 2007/0018127 A1 * | 1/2007 | Seberger | F16K 37/0083 251/129.04 |
| 2007/0183901 A1 | 8/2007 | Chester et al. | |
| 2009/0199703 A1 | 8/2009 | Hoffmann et al. | |
| 2010/0315069 A1 * | 12/2010 | Heer | G05B 23/0256 324/207.11 |
| 2011/0114191 A1 * | 5/2011 | Wheater | F16K 37/0091 137/12 |
| 2011/0252895 A1 * | 10/2011 | Kiesbauer | F16K 37/0091 73/862.583 |
| 2012/0310582 A1 * | 12/2012 | Al-Buaijan | F15B 19/005 702/114 |
| 2013/0000753 A1 | 1/2013 | Penning et al. | |
| 2013/0119285 A1 * | 5/2013 | Al-Buaijan | F16K 37/0091 251/12 |
| 2014/0102549 A1 | 4/2014 | Okuda | |
| 2015/0323936 A1 | 11/2015 | Junk | |
| 2016/0098044 A1 | 4/2016 | Junk et al. | |
| 2016/0273676 A1 | 9/2016 | Junk | |
| 2016/0274598 A1 * | 9/2016 | Junk | F15B 19/005 |
| 2016/0356396 A1 | 12/2016 | Kah | |
| 2017/0184215 A1 * | 6/2017 | Junk | F16K 31/1635 |
| 2017/0198829 A1 * | 7/2017 | Alkandari | F16K 37/00 |
| 2017/0350421 A1 * | 12/2017 | Gagne | F16K 31/12 |
| 2018/0112796 A1 | 4/2018 | Junk et al. | |
| 2018/0112797 A1 | 4/2018 | Junk et al. | |

OTHER PUBLICATIONS

Norgren, "Emergency Shut-Down Solutions—Process Safety, Reliability, & Efficiency," IMI Norgren Co., Ltd. 2008, 4 pages.
IMI Precision Engineering,"ICO4-PST Solenoid Valve—The Smart Solenoid for Integrated Partial Stroke Testing," Norgren Limited, 2015, 8 pages.
IMI Precision Engineering, "ICO4-PST Frequently Asked Questions" Version 2, Jul. 2015, 6 pages.
United States Patent and Trademark Office, "Notice of Allowance," issued in connection with U.S. Appl. No. 15/298,726, dated Nov. 5, 2018, 6 pages.
International Searching Authority, "International Search Report and Written Opinion," issued in connection with International Patent Application No. PCT/US2017/055124, dated Feb. 8, 2018, 12 Pages.
United States Patent and Trademark Office, "Notice of Allowance and Fee(s) Due," issued in connection with U.S. Appl. No. 15/298,717, dated May 1, 2018, 10 pages.
United States Patent and Trademark Office, "Non-Final Office Action," issued in connection with U.S. Appl. No. 15/298,726, dated Sep. 10, 2018, 10 pages.

* cited by examiner

| INDIVIDUAL SOLENOID TEST | INDIVIDUAL PARTIAL STROKE TEST | CONCATENATED TEST | | RESULT |
|---|---|---|---|---|
| | | ENABLE | ACTION UPON ERROR | |
| F | F | F | - | DISABLE ALL TESTS |
| F | F | T | STOP | CONCATENATE TEST ONLY: BREAK CONCATENATION UPON ERROR |
| F | F | T | CONTINUE | CONCATENATED TEST ONLY: CONTINUE UPON ERROR |
| T | F | F | - | SOLENOID TEST ONLY |
| T | F | T | STOP | SOLENOID TEST OR CONCATENATED TEST: BREAK CONCATENATION UPON ERROR |
| T | F | T | CONTINUE | SOLENOID TEST OR CONCATENATED TEST: CONTINUE UPON ERROR |
| F | T | F | - | INDIVIDUAL PARTIAL STROKE TEST ONLY |
| F | T | T | STOP | INDIVIDUAL PARTIAL STROKE TEST OR CONCATENATED TEST ONLY: BREAK CONCATENATION UPON ERROR |
| F | T | T | CONTINUE | INDIVIDUAL PARTIAL STROKE TEST OR CONCATENATED TEST: CONTINUE UPON ERROR |
| T | T | F | - | INDIVIDUAL TESTS ONLY |
| T | T | T | STOP | INDIVIDUAL TESTS OR CONCATENATED TEST: BREAK CONCATENATION UPON ERROR |
| T | T | T | CONTINUE | INDIVIDUAL TESTS OR CONCATENATED TEST: CONTINUE UPON ERROR |

FIG. 12

METHODS AND APPARATUS OF TESTING A SOLENOID VALVE OF AN EMERGENCY VALVE VIA A POSITIONER

CROSS-REFERENCE TO RELATED APPLICATIONS

This patent relates to subject matter disclosed in a U.S. patent application Ser. No. 15/298,726 entitled "Methods and Apparatus of Assessing a Test of a Solenoid Valve via a Positioner" and a U.S. patent application Ser. No. 15/298,717 entitled "Methods and Apparatus of Stabilizing a Valve Positioner When Testing a Solenoid Valve", both of which were filed on Oct. 20, 2016 and are incorporated herein by reference in their entireties.

FIELD OF THE DISCLOSURE

This patent relates generally to testing a solenoid valve and, more particularly, to methods and apparatus of testing a solenoid valve of an emergency valve via a positioner.

BACKGROUND

Emergency valves (e.g., shutdown valves, vent valves) oftentimes are used in environments (e.g., within the oil and gas industry) to protect people, equipment and/or the environment in dangerous conditions. For example, an emergency shutdown valve may be actuated (e.g., closed) to stop flow of hazardous material upon detection of a dangerous condition. In some instances, tests are conducted on the emergency valves to verify that the emergency shutdown valves are capable of actuating.

SUMMARY

In one example, a method includes conducting a solenoid valve test by initiating, by executing first instructions via a processor, a pulse duration and a monitoring duration for a solenoid valve test. Conducting the solenoid valve test further includes instructing, by executing second instructions via the processor, a solenoid valve to transition from a first state to a second state during the pulse duration. The solenoid valve is in fluid communication with an actuator to enable the actuator to actuate an emergency valve. Conducting the solenoid valve test further includes determining, by executing third instructions via the processor, a functionality of the solenoid valve by measuring, via a valve positioner, a maximum pressure change of a pressure chamber of the actuator during the monitoring duration. The method includes, upon determining the solenoid valve is in a functioning state, conducting, by executing fourth instructions via the processor, a partial stroke test of the emergency valve via the valve positioner.

In another example, an apparatus includes a solenoid valve in fluid communication with a pressure chamber of an actuator to enable the actuator to actuate an emergency valve. The solenoid valve has a first state and a second state. The apparatus includes a valve positioner having a processor to initiate a pulse duration and a monitoring duration for a solenoid valve test of the solenoid valve, instruct the solenoid valve to transition from the first state to the second state during the pulse duration, determine a functionality of the solenoid valve by measuring a maximum pressure change of the pressure chamber of the actuator during the monitoring duration, and conduct, upon determining the solenoid valve is in a functioning state, a partial stroke test of the emergency valve.

In another example, an apparatus includes means for actuating an actuator to actuate an emergency valve. The means for actuating the actuator is in fluid communication with a pressure chamber of the actuator. The means for actuating the actuator has a first state and a second state. The apparatus includes means for positioning to initiate a pulse duration and a monitoring duration for a test of the means for actuating the actuator, instruct the means for actuating the actuator to transition from the first state to the second state during the pulse duration, determine a functionality of the means for actuating the actuator by measuring a maximum pressure change of the pressure chamber of the actuator during the monitoring duration, and conduct, upon determining the means for actuating the actuator is in a functioning state, a partial stroke test of the emergency valve.

BRIEF DESCRIPTION OF THE DRAWINGS

FIG. 12 depicts a list of valid configurations and/or tests that the valve positioner of FIGS. 1-2 and 5-8 is able to conduct for the solenoid valve of FIGS. 2-8 and/or the shutdown valve of FIG. 1 in accordance with the teachings of this disclosure.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
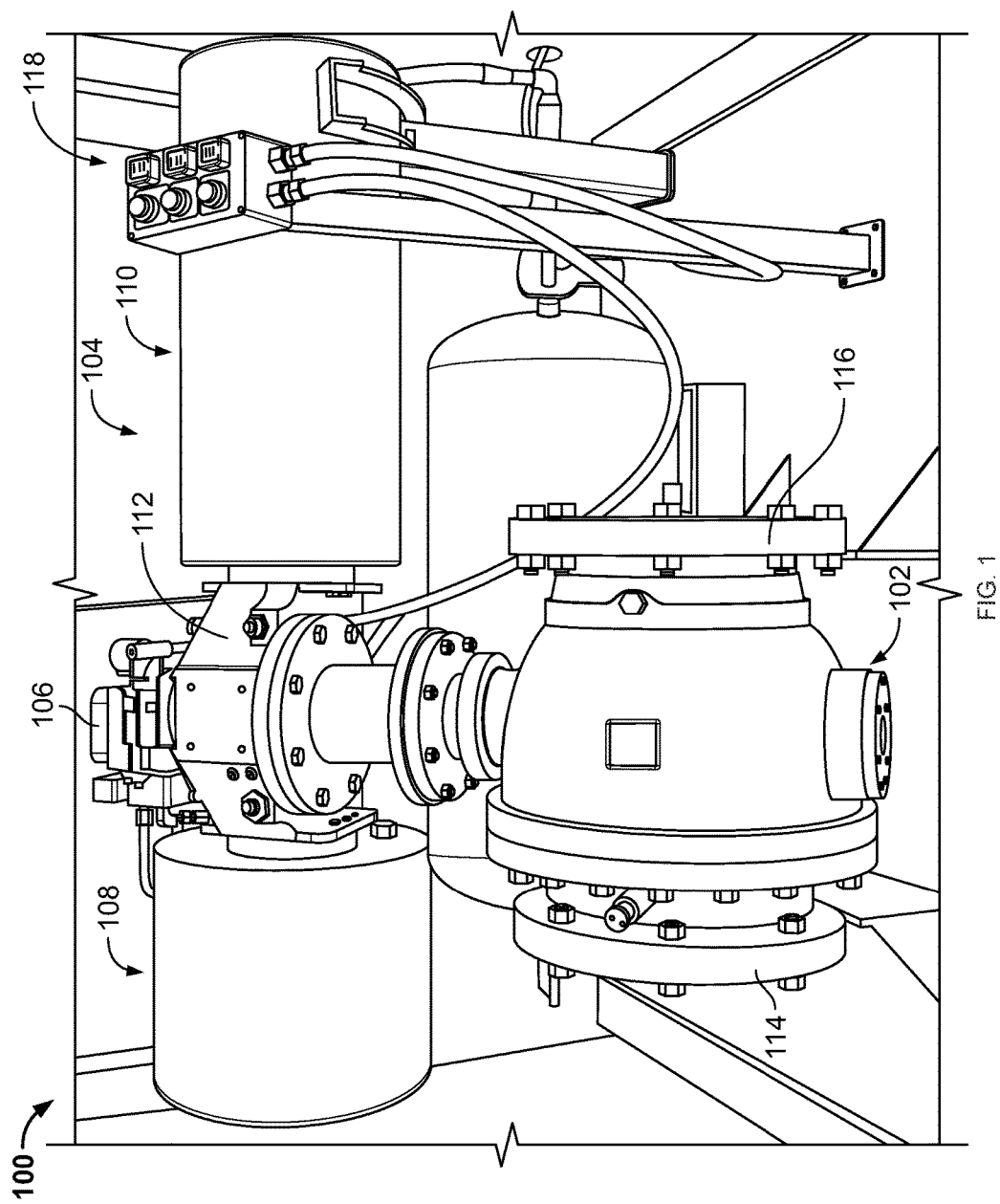
FIG. 1 illustrates an example shutdown valve, an example actuator, and an example valve positioner in accordance with the teachings of this disclosure.

Emergency valves (e.g., shutdown valves, vent valves) are utilized in environments, such as within the oil and gas industry, to protect people, equipment and/or the environment in dangerous conditions. For example, a shutdown valve may be closed upon detection of dangerous condition(s) to stop flow of hazardous material and, thus, reduce risk of harm to the people, equipment and/or environment.

For example, some known shutdown valves are actuated (e.g., closed, opened) via an actuator that is operatively coupled to a solenoid valve in communication with a controller (e.g., a programmable controller, a programmable logic controller, a logic solver, etc.). In some instances, the actuator includes a piston that is disposed in a chamber and operatively coupled to a spring. When pressure within the chamber applies a force to the piston that is greater than a preset load of the spring, the piston prevents the spring and, thus, the actuator from actuating, thereby retaining the shutdown valve in an open position. When the pressure within the chamber falls below the preset load of the spring, the spring causes the piston within the chamber to actuate and, thus, causes the actuator to actuate the shutdown valve from the open position to a closed position. In some instances, the position of the actuator is controlled by the solenoid valve that provides air to and/or removes (e.g., exhausts, vents) air from the chamber. For example, the solenoid valve vents air from the actuator upon receiving an emergency signal from the controller that is in communication with a sensor detecting the existence of the dangerous and/or hazardous condition(s).

In some instances, an environment may not have dangerous and/or hazardous condition(s) for extended periods of time. As a result, the emergency valve, the actuator and/or the solenoid valve may not actuate for an extended period of time. In such instances, the emergency valve, the actuator and/or the solenoid valve may deteriorate and/or become damaged in a manner that causes the emergency valve to fail to actuate (e.g., close for a shutdown valve, open for a vent valve) upon detection of a dangerous and/or hazardous condition. To verify that the emergency valve will actuate upon detection of such conditions, some emergency valves are tested periodically.

Some known emergency valves are tested via a partial stroke test. To conduct a partial stroke test, a positioner is operatively coupled to the actuator so that the position of the actuator and, thus, the emergency valve is controlled by the positioner (not the solenoid valve) during the test. For example, during a partial stroke test of a shutdown valve, the positioner causes the actuator to partially actuate the shutdown valve (e.g., travel a fraction of a full stroke to the closed position such as about between 10% and 15%) from the open position. Because the partial stroke test partially closes the shutdown valve, the partial stroke test interrupts and/or disturbs operation of a system in which the shutdown valve is installed while the partial stroke test is being conducted. As a result, emergency valves oftentimes are tested via a partial stroke test only once every couple of years. Further, because the actuator and the emergency valve are controlled directly by the positioner during a partial stroke test, such tests fail to verify that the solenoid valve has not deteriorated and/or otherwise become damaged over time in such a manner that would prevent the emergency valve from actuating when a hazardous and/or dangerous condition is detected.

Other known emergency valves are tested by tripping the solenoid valve (e.g., by de-energizing the solenoid valve) to cause the emergency valve to partially close (e.g., to a predetermined partially open position). However, such tests may be difficult to control because the solenoid valve has only two control states (e.g., energized and de-energized) that prohibit precise control of the actuator and, thus, precise control of the emergency valve as air is being vented from the actuator. Further, because the pressure in the chamber at the rest position of the actuator corresponds to a force that is typically significantly greater than the preset load of the spring, it is oftentimes difficult to determine how much air must be vented from the chamber before the actuator starts to actuate the emergency valve. Additionally, communicative, electrical and/or mechanical delays in the system may make it difficult to determine how long the solenoid valve should actuate the actuator to partially close and/or partially open the emergency valve and/or return the emergency valve to its rest position. As a result of the difficulty in controlling such tests, the emergency valve oftentimes does not actuate, thereby resulting in a false negative (e.g., as a result of the solenoid valve being tripped for too short of a duration of time). In other instances, such tests result in the shutdown valve actuating more than a desired amount (e.g., over-travel such as fully closing a shutdown valve that results from the solenoid valve being tripped for too long of a duration of time), thereby further interrupting and/or disturbing the system in which the emergency valve is implemented. Moreover, because emergency valves oftentimes are tested once every couple of years by tripping the solenoid valve, such tests may not detect a damaged solenoid valve, which oftentimes deteriorate more frequently than the actuator and/or the emergency valve, in a timely manner.

The example methods and apparatus disclosed herein enable a solenoid valve that controls actuation of an emergency valve (e.g., a shutdown valve, a vent valve) of an emergency system to be tested, via a positioner, independently and/or in concatenation with a test of the emergency valve. Thus, examples disclosed herein enable testing of the solenoid valve without testing the emergency valve, testing the emergency valve without testing the solenoid valve, and/or concatenated testing of the solenoid valve and the emergency valve. For example, the positioner of the examples disclosed herein enables an emergency valve test (e.g., a partial stroke test) to be scheduled to be conducted automatically upon completion of (e.g., in concatenation with) a solenoid valve test, thereby enabling the solenoid valve and the shutdown valve to be tested on a regular basis (e.g., at regular intervals). Further, the examples disclosed herein test the solenoid valve without actuating the shutdown valve and, thus, without interrupting and/or disturbing a system in which the shutdown valve is installed. As a result, solenoid valve tests may be conducted more frequently (e.g., monthly) than emergency valve tests (e.g., quarterly, yearly, etc.) to detect a damaged solenoid valve between emergency valve tests. Further, the positioner of the examples disclosed herein enables a test of the shutdown valve (e.g., a partial stroke test) to be scheduled to be automatically conducted upon completion of a test of the solenoid valve, thereby enabling the solenoid valve and the shutdown valve to be tested on a regular basis (e.g., at regular intervals).

Examples disclosed herein conduct, via a valve positioner having a processor, a test of a solenoid valve of an emergency system and a partial stroke test of an emergency valve (e.g., a shutdown valve, a vent valve) of the emergency system. The solenoid valve is in fluid communication with a pressure chamber of an actuator to enable the actuator to actuate the emergency valve. The solenoid valve has a first state and a second state. To conduct the test of the solenoid valve (e.g., a first solenoid valve test), the valve positioner initiates a pulse duration and a monitoring duration for the solenoid valve test. The valve positioner instructs the solenoid valve to transition from the first state to the second state during the pulse duration. For example, the valve positioner is coupled to the solenoid valve via wiring to enable the valve positioner to interrupt power provided to the solenoid valve to instruct the solenoid valve to be in the second state. The valve positioner determines a functionality of the solenoid valve by measuring a maximum pressure change of the pressure chamber of the actuator during the monitoring duration. Further, upon determining that the solenoid valve is in a functioning state, the valve positioner conducts the partial stroke test (e.g., a first partial stroke test) of the emergency valve. That is, the examples disclosed herein conduct a concatenated test of the solenoid valve and the emergency valve of the emergency system.

In some examples, the valve positioner identifies that the partial stroke test is to be conducted upon conducting the test of the solenoid valve and before conducting the partial stroke test of the emergency valve. If the valve positioner determines that solenoid valve is in an error state, the valve positioner may abort the partial stroke test of the emergency valve. Alternatively, if the valve positioner determines that the solenoid valve is in the error state, the valve positioner may proceed with conducting the partial stroke test of the emergency valve. In some examples, the valve positioner conducts another test of the solenoid valve (e.g., a second solenoid valve test) without conducting another partial stroke test (e.g., a second partial stroke test) of the emergency valve. Additionally or alternatively, the valve positioner conducts another partial stroke test (e.g., a third partial stroke test) without conducting another test of the solenoid valve (e.g., a third solenoid valve test). For example, a control panel can be utilized to initiate one or more of the tests of the solenoid valve and/or the emergency valve of the emergency system.

In some examples, to measure the maximum pressure change in the pressure chamber of the actuator, the valve positioner measures a first pressure of the pressure chamber prior to instructing the solenoid valve to the second state, measures a lowest second pressure of the pressure chamber during the monitoring duration, and compares the first pressure and the lowest second pressure. Additionally or alternatively, the functionality of the solenoid valve is further based on a final pressure change of the pressure chamber that is measured by the valve positioner. For example, to measure the final pressure change, the valve positioner instructs the solenoid valve to return to the first state upon completion of the pulse duration, measures a third pressure of the pressure chamber upon completion of the monitoring duration, and compares the first pressure and the third pressure.

In the disclosed examples, the valve positioner is in fluid communication with the solenoid valve and the pressure chamber of the actuator. For example, the valve positioner includes a first pressure port that is in fluid communication with a first valve port of the solenoid valve and a second pressure port that is in fluid communication with a sense line that measures the pressure change of the pressure chamber. Additionally or alternatively, the solenoid valve includes a third valve port that is in fluid communication with a vent.

Further, the examples disclosed herein enable the solenoid valve to remain in the second state for a period of time (e.g., a period of time commensurate with the pulse duration) before the shutdown valve begins to close (e.g., change a position of the shutdown valve) via the actuator. The valve positioner of the disclosed apparatus tests the solenoid valve without actuating and/or affecting a position (e.g., without closing or partially closing) the shutdown valve. For example, the first pressure in the pressure chamber of the actuator produces a first force in the pressure chamber. The first force is greater than a preload of the actuator so that the solenoid valve does not cause the actuator to move the emergency valve from a rest position in the first state. Further, the second pressure of the pressure chamber when the solenoid valve is in the second state is to be less than the first pressure in the first state. The second pressure produces a second force that is greater than the preload of the actuator to prevent the solenoid valve from causing the actuator to move the shutdown valve from the rest position in the second state.

Turning to the figures, FIG. 1 illustrates an example emergency system 100 as disclosed herein. In the illustrated example, the emergency system 100 includes a shutdown valve 102, an actuator 104, a solenoid valve (e.g., a solenoid valve 202 of FIG. 2), and a valve positioner 106 (e.g., a digital valve controller). The actuator 104 includes a first chamber 108, a second chamber 110, and a drive module housing 112. The first chamber 108 houses a piston (e.g., a piston 510 of FIG. 5) and the second chamber 110 houses a spring (e.g., a spring 514 of FIG. 5) that actuates a shaft (e.g., a shaft 502 of FIG. 5) of the actuator 104 disposed in the drive module housing 112. As illustrated in FIG. 1, the shutdown valve 102 is coupled to the drive module housing 112 of the actuator 104. The shutdown valve 102 includes a valve member (e.g., a ball) that transitions the shutdown valve 102 between an open position and a closed position to control an amount of fluid flowing between a first end 114 and a second end 116 of the shutdown valve 102. The shaft of the actuator 104 is operatively coupled to the valve member of the shutdown valve 102 to enable the actuator 104 to transition the shutdown valve 102 between the open position and the closed position.

In operation, upon detection of a hazardous and/or dangerous environment or condition, the actuator 104 causes the shutdown valve 102 to transition to the closed position. For example, the shutdown valve 102 closes to prevent the fluid (e.g., potentially hazardous material) from flowing when a dangerous condition is detected to increase and/or improve safety of people, equipment and/or the environment. Because hazardous and/or dangerous conditions may not be detected for extended periods of time, the valve positioner 106 of the example emergency system 100 periodically tests the functionality of the shutdown valve 102 and/or the actuator 104 (e.g., via a partial stroke test) to verify that the shutdown valve 102 is capable of closing. For example, the valve positioner 106 periodically conducts a partial stroke test to determine whether the actuator 104 and/or the shutdown valve 102 is damaged and/or otherwise fails to function. Further, in the illustrated example, the emergency system 100 includes a control panel 118 that enables an operator to initiate the valve positioner 106 to test the shutdown valve 102, the actuator 104 and/or the solenoid of the emergency system 100. While the emergency system 100 of the illustrated example includes the shutdown valve 102, the emergency system 100 may alternatively include another type of emergency valve such as a vent valve and/or any other type of valve capable of being actuated via the actuator 104.

Figure 2:
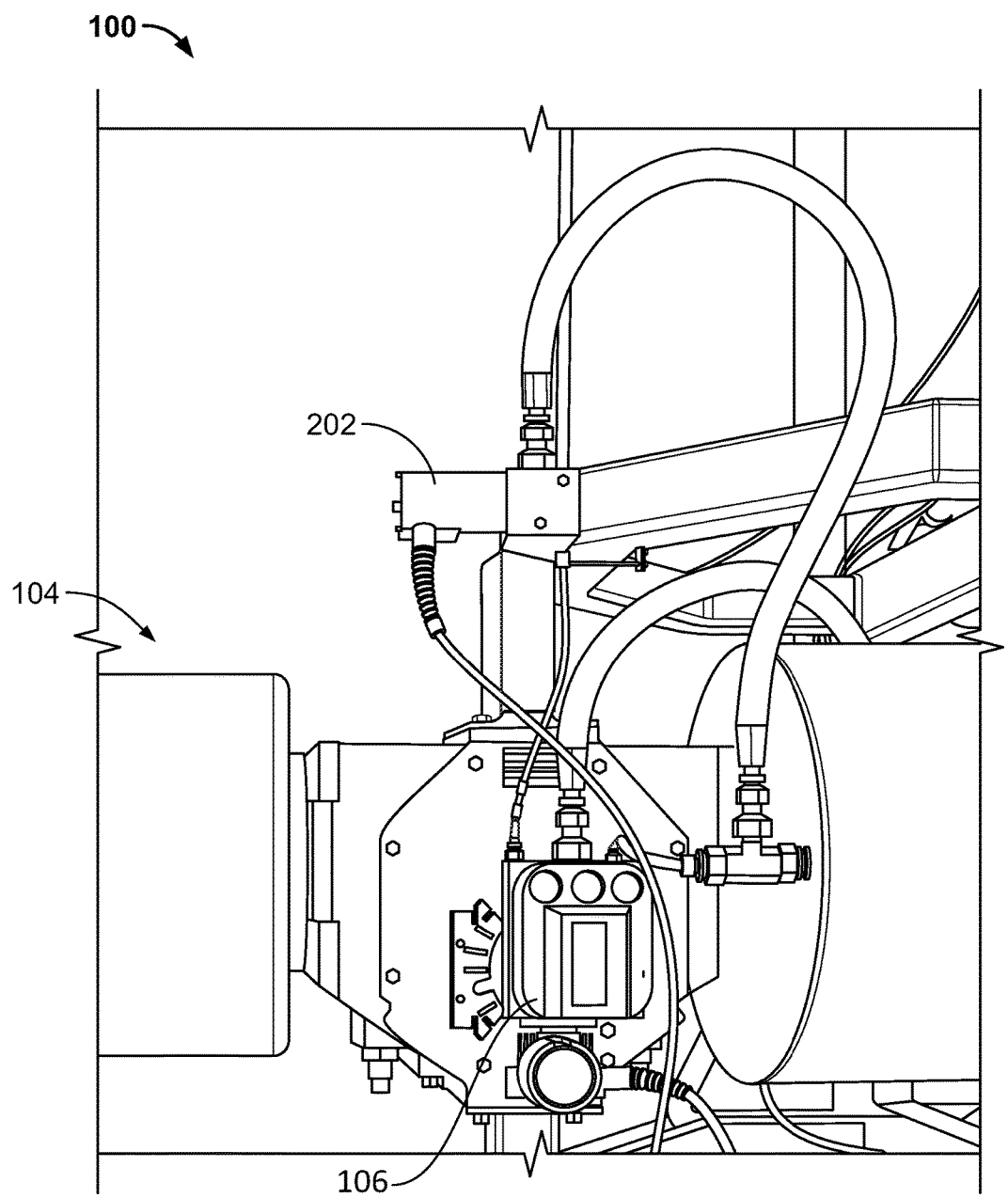
FIG. 2 illustrates the actuator and the valve positioner of FIG. 1 and an example solenoid valve in accordance with the teachings of this disclosure.

FIG. 2 illustrates the valve positioner 106, the solenoid valve 202, and a portion of the actuator 104 of the example emergency system 100. In operation, upon detection of a hazardous and/or dangerous environment, the solenoid valve 202 is de-energized (e.g., power is not supplied to the solenoid valve 202) to cause the solenoid valve 202 to actuate the actuator 104 which, in turn, actuates the shutdown valve 102 (FIG. 1) toward a trip position (e.g., the closed position for the shutdown valve 102). In addition to periodically testing the shutdown valve 102 and/or the actuator 104, the valve positioner 106 of the example emergency system 100 periodically tests the solenoid valve 202 to verify that the solenoid valve 202 will actuate the actuator 104 upon detection of a trip (e.g., hazardous and/or dangerous) condition. For example, the valve positioner 106 conducts a test to determine whether the solenoid valve 202 switches, upon the valve positioner 106 interrupting power provided to the solenoid valve 202, from a first state (e.g., an energized state, a normal state) to a second state (e.g., a de-energized state, an emergency state, a trip state) to actuate the actuator 104.

Figure 3:
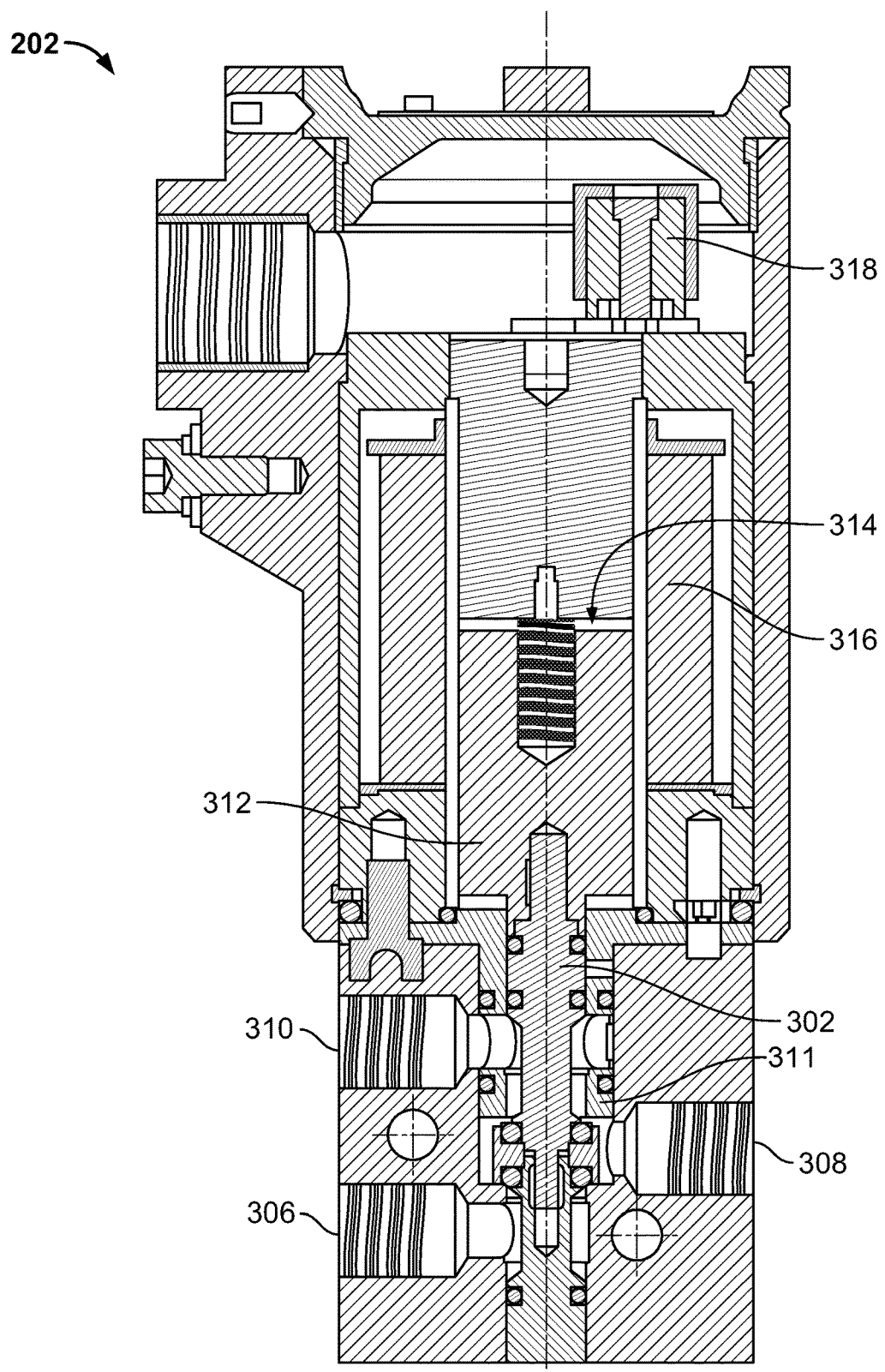
FIG. 3 is a cross-sectional view of the solenoid valve of FIG. 2.

FIG. 3 is a cross-sectional view of the example solenoid valve 202 of the emergency system 100 (FIGS. 1-2). As illustrated in FIG. 3, the solenoid valve 202 is a 3/2-way valve in which a stem 302 actuates to define two alternate fluid paths between three ports. For example, in a first state (e.g., an energized state, a normal state), the stem 302 of the solenoid valve 202 defines a first fluid path between a first valve port 306 and a second valve port 308. To define the first fluid path of the first state, the stem 302 blocks, seals and/or otherwise prevents fluid to flow through a third valve port 310. Further, as illustrated in FIG. 3, the stem 302 may be actuated to transition the solenoid valve 202 to a second state (e.g., a de-energized state, an emergency state, a trip state) in which the stem 302 defines a second fluid path 311 of the solenoid valve 202 between the second and third valve ports 308, 310 by blocking, sealing and/or otherwise preventing fluid to flow through the first valve port 306.

As illustrated in FIG. 3, the stem 302 is coupled to an armature 312 such that movement of the armature 312 along a pathway 314 causes the stem 302 to traverse between the first state and the second state of the solenoid valve 202. In the illustrated example, the armature 312 is at least partially disposed in the pathway 314 formed by a solenoid coil 316 that produces a magnetic field. The armature 312 is composed of magnetic material. As a result, the magnetic field produced by the solenoid coil 316 urges, moves and/or actuates the armature 312 as the solenoid coil 316 transitions between an energized state and a de-energized state to cause the stem 302 to transition between the first state and the second state of the solenoid valve 202. In the illustrated example, the solenoid coil 316 is de-energized and the armature 312 and the stem 302 are positioned in the second state of the solenoid valve 202. When the solenoid coil 316 is energized, the magnetic field produced by the solenoid coil 316 changes, thereby causing the magnetic armature 312 and the stem 302 coupled to the armature 312 to actuate along the pathway 314 to the first state of the solenoid valve 202. To de-energize the solenoid coil 316, the valve positioner 106 interrupts power provided to the solenoid valve 202 (e.g., for a pulse duration) via wiring that is coupled to the solenoid valve 202 via a terminal block 318. For example, the wiring is coupled to the terminal block 318 to communicatively couple the solenoid valve 202 to the valve positioner 106 (FIGS. 1 and 2) that tests the functionality of the solenoid valve 202 and/or to a controller (e.g., a programmable controller, a programmable logic controller, a logic solver, etc.) that detects hazardous and/or dangerous conditions via sensor(s).

Figure 4:
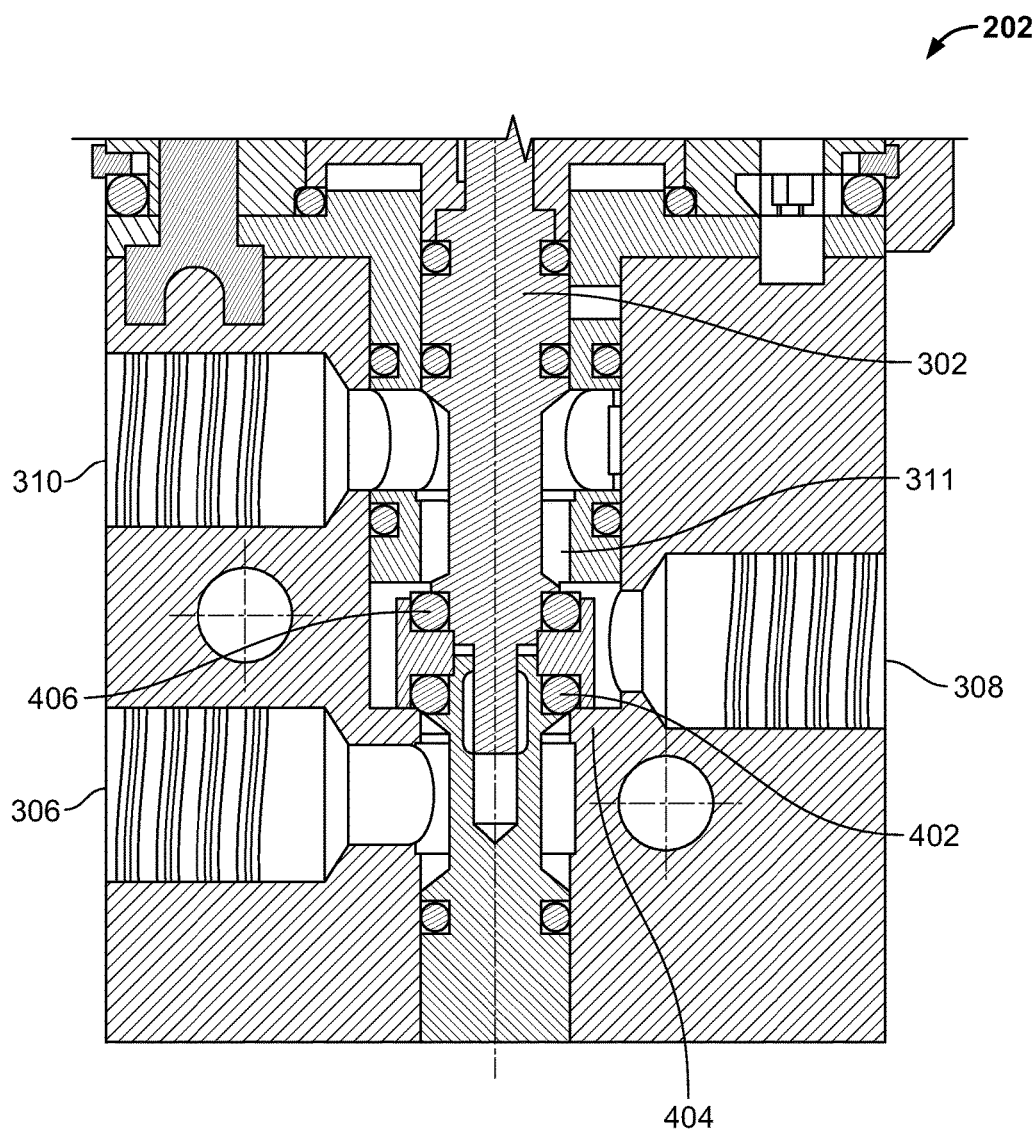
FIG. 4 is an enlarged cross-sectional view of valve ports of the solenoid valve of FIG. 2.

FIG. 4 is an enlarged cross-sectional view of the first, second, and third valve ports 306, 308, 310 and the stem 302 when the solenoid valve 202 is in the second state. In the illustrated example, the stem 302 includes a first seal 402 (e.g., a first o-ring) that engages a body 404 of the solenoid valve 202 adjacent the first valve port 306. The first seal 402 forms a seal with the body 404 of the solenoid valve 202 to prevent the first valve port 306 from being in fluid communication with the third valve port 310 and the second valve port 308 when the solenoid valve 202 is in the second state. Further, the stem 302 does not block the third valve port 310 or the second valve port 308 when the solenoid valve 202 is in the second state to define the second fluid path 311 of the second state.

As illustrated in FIG. 4, the stem 302 includes a second seal 406 (e.g., a second o-ring) that is to engage the body 404 of the solenoid valve 202 adjacent the third valve port 310 when the solenoid valve 202 is in the first state. The second seal 406 forms a seal with the body 404 of the solenoid valve 202 to prevent the third valve port 310 from being in fluid communication with the second valve port 308 or the first valve port 306 in the first state of the solenoid valve 202. Further, the stem 302 does not block the second valve port 308 or the first valve port 306 when the solenoid valve 202 is in the first state to define the first fluid path of the first state.

Figure 5:
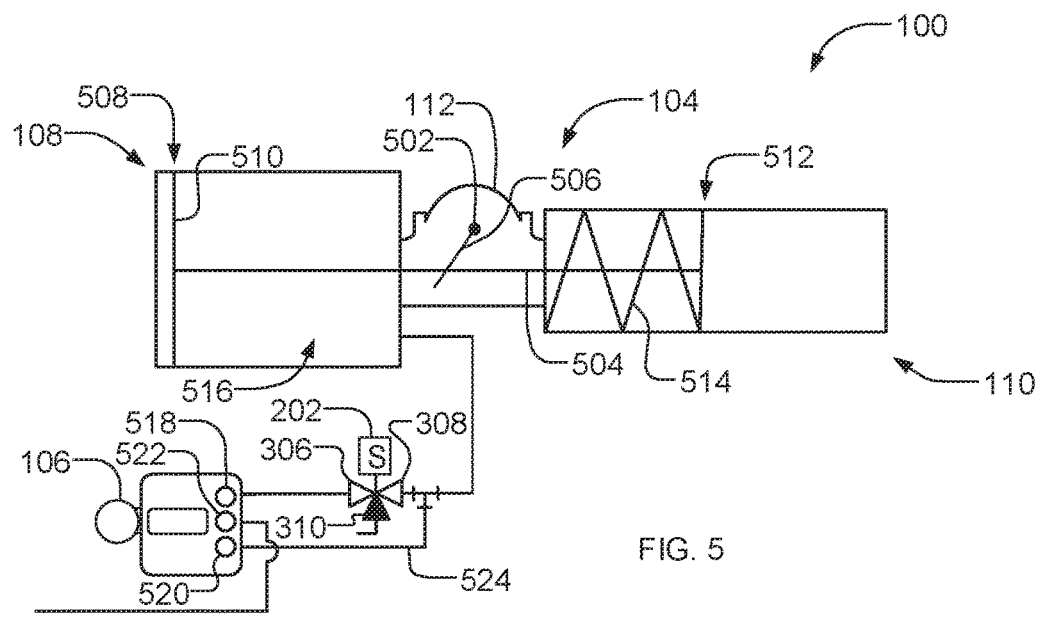
FIG. 5 is a fluid flow schematic of the actuator, the valve positioner, and the solenoid valve of FIGS. 1-2 in a first state in accordance with the teachings of this disclosure.
Figure 6:
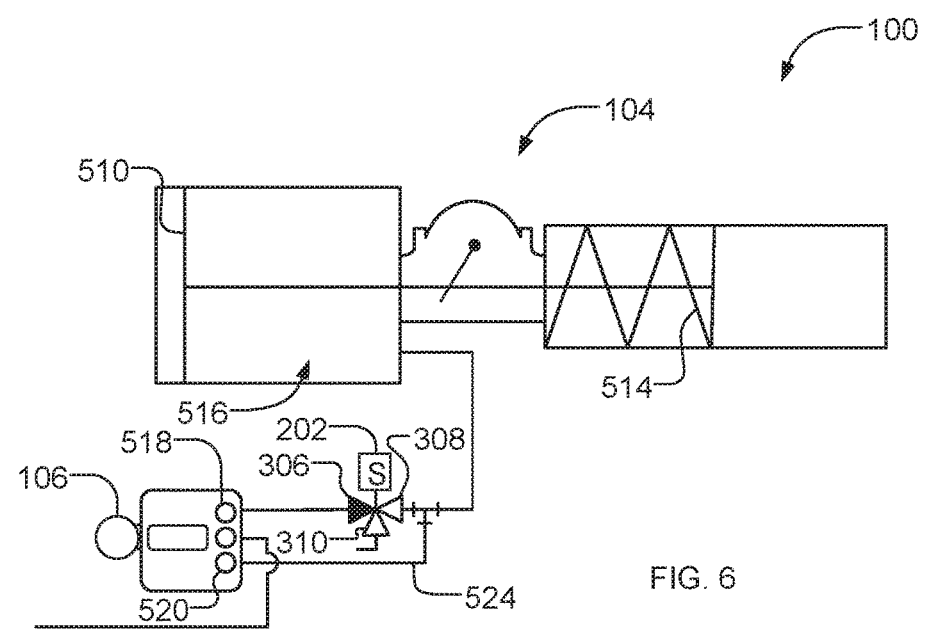
FIG. 6 is a fluid flow schematic of the actuator, the valve positioner, and the solenoid valve of FIGS. 1-2 in a second state in accordance with the teachings of this disclosure.

FIGS. 5 and 6 depict a fluid flow schematic of the example emergency system 100 in which the valve positioner 106 tests the functionality of the solenoid valve 202 independently of testing the functionality of the shutdown valve 102 (FIG. 1) and/or the actuator 104. More specifically, FIG. 5 illustrates the emergency system 100 during testing of the solenoid valve 202 when the solenoid valve 202 is in the first state (e.g., the energized state, the normal state), and FIG. 6 illustrates the emergency system 100 during testing of the solenoid valve 202 when the solenoid valve 202 is in the second state (e.g., the de-energized state, the emergency state, the trip state).

As illustrated in FIG. 5, the actuator 104 includes a shaft 502 that is operatively coupled to the valve member of the shutdown valve 102 to actuate the shutdown valve 102 between the open and closed positions. The shaft 502 is operatively coupled to a stem 504 of the actuator 104 via a yoke mechanism 506 disposed in the drive module housing 112. A first end 508 of the stem 504 extends into the first chamber 108 of the actuator 104 and couples to a piston 510 disposed in the first chamber 108, and a second end 512 of the stem 504 extends into the second chamber 110 and couples to a spring 514 disposed in the second chamber 110.

In FIG. 5, the actuator 104 is in a rest position that corresponds to the open position of the shutdown valve 102. For example, the spring 514 is preloaded such that the spring 514 is compressed within the second chamber 110. Further, pressure within a pressure chamber 516 of the first chamber 108 exerts a force on the piston 510 in a first direction (e.g., to the left in the illustrated example) that is substantially greater than a force (e.g., a preload) exerted by the spring 514 onto the second end 512 of the stem 504 in an opposing direction (e.g., to the right in the illustrated example). The actuator 104 remains in the rest position until the force applied by the spring 514 overcomes the force applied by the pressure in the pressure chamber 516. For example, upon detection of a hazardous and/or dangerous condition, the pressure chamber 516 may be vented for a period of time to substantially reduce the pressure within the pressure chamber 516. In such instances, the actuator 104 begins to close the shutdown valve 102 only when the force applied to the piston 510 becomes less than the force applied by the spring 514.

Further, as illustrated in FIG. 5, the actuator 104, the valve positioner 106, and the solenoid valve 202 of the example emergency system 100 are fluidly coupled together. The valve positioner 106 includes a first pressure port 518, a second pressure port 520, and a third pressure port 522. The third pressure port 522 receives supply fluid (e.g., unregulated plant air) that is provided to the first pressure port 518, the first pressure port 518 is in fluid communication with the first valve port 306 of the solenoid valve 202, and the second pressure port 520 is in fluid communication with the second valve port 308 of the solenoid valve 202 and the pressure chamber 516 of the actuator 104 via a sense line 524. Further, the third valve port 310 is in fluid communication with a vent.

In FIG. 5, the solenoid valve 202 is in the first state in which the third valve port 310 is closed to form the first fluid path between the first valve port 306 and the second valve port 308. As a result, the pressure chamber 516 of the actuator 104 is in fluid communication with and receives fluid from the first pressure port 518 of the valve positioner 106. For example, the fluid provided by the first pressure port 518 causes the pressure chamber 516 to produce a first pressure in the pressure chamber 516 when the solenoid valve 202 is in the first state. The first pressure of the pressure chamber 516 applies a first force to the piston 510 that is greater than a preload of the actuator 104 (e.g., provided by the spring 514), thereby enabling the actuator 104 to remain in the rest position when the solenoid valve 202 is in the first state.

Further, the valve positioner 106 tests the functionality of the solenoid valve 202 by determining whether the solenoid valve 202 transitions between the first state (FIG. 5) and the second state (FIG. 6) when valve positioner 106 instructs the solenoid valve 202 to do so (e.g., by interrupting power provided to the solenoid valve 202). For example, the valve positioner 106 detects whether the solenoid valve 202 transitions from the first state to the second state by determining whether there is a change in pressure within the pressure chamber 516 of the actuator 104. Because the force applied to the piston 510 by the pressure of the pressure chamber 516 is substantially greater than the force applied by the spring 514 when the solenoid valve 202 of the example emergency system 100 is in the first state, the valve positioner 106 is able to verify the functionality of the solenoid valve 202 by inducing and measuring a relatively small decrease in pressure without affecting the position of the actuator 104 and/or the shutdown valve 102 (e.g., without closing the shutdown valve 102).

To detect a change of the pressure chamber 516 of the actuator 104 that is in fluid communication with the solenoid valve 202, the second pressure port 520 of the valve positioner 106 measures a pressure of the pressure chamber 516 via the sense line 524. For example, the valve positioner 106 initially measures, via the sense line 524, a first pressure of the pressure chamber 516 when the solenoid valve 202 is instructed to be in the first state. Subsequently, the valve positioner 106 instructs the solenoid valve 202 to transition to the second state (e.g., by interrupting the power provided to the solenoid valve 202).

FIG. 6 depicts the example emergency system 100 when the solenoid valve 202 is in the second state. As illustrated in FIG. 6, the first valve port 306 is closed in the second state, thereby forming the second fluid path 311 (FIGS. 3-4) between the second valve port 308 and the third valve port 310 of the solenoid valve 202. Thus, when the solenoid valve 202 is in the second state, the solenoid valve 202 enables fluid to be vented from the pressure chamber 516, through the second fluid path 311 of the solenoid valve 202, and to the vent. As a result, the pressure measured by the second pressure port 520 in the illustrated example decreases over time when the solenoid valve 202 is in the second state relative to when the solenoid valve 202 is in the first state.

When the solenoid valve 202 is instructed to be in the second state, the second pressure port 520 of the valve positioner 106 measures, via the sense line 524, a second pressure of the pressure chamber 516 of the actuator 104 that is fluidly coupled to the solenoid 202. In some examples, the valve positioner 106 continuously monitors the pressure in the pressure chamber 516 for a predetermined amount of time (e.g., for a monitoring period). To determine the functionality of the solenoid valve 202, the valve positioner 106 determines and/or calculates a maximum change in pressure based on the first pressure and the lowest second pressure measured during the monitoring period. Because the solenoid valve 202 causes the pressure chamber 516 that is in fluid communication with the second pressure port 520 to vent in the second state, the second pressure port 520 detects a decrease in pressure if the solenoid valve 202 transitions from the first state to the second state.

Thus, if the second pressure port 520 of the valve positioner 106 does not measure a decrease in pressure (e.g., the first change in pressure is not a negative value) during the monitoring period, the valve positioner 106 determines that the solenoid valve 202 has not transitioned from the first state to the second state and, thus, an error has occurred with the solenoid valve 202. Conversely, the valve positioner 106 may determine that the solenoid valve 202 is functioning properly (e.g., the solenoid valve 202 transitions from the first state to the second state upon receiving a signal to do so) if the second pressure port 520 of the valve positioner 106 detects a decrease in pressure (e.g., the first change in pressure is a negative value) during the monitoring period.

Further, the valve positioner 106 may determine that there is an error with the solenoid valve 202 if the maximum pressure change fails to satisfy (e.g., fails to exceed) a maximum pressure change threshold (e.g., a trip pressure threshold). Conversely, the valve positioner 106 may determine that the solenoid valve 202 is functioning properly if the maximum pressure change satisfies (e.g., exceeds) a maximum pressure change threshold (e.g., a trip pressure threshold).

During testing, the solenoid valve 202 is to stay in the second state and vent the pressure chamber 516 for a relatively short period of time (e.g., a period of time commensurate with the pulse duration). As a result, the force applied to the piston 510 by the pressure chamber 516 remains greater than the force applied by the spring 514 during testing of the solenoid valve 202. For example, a pressure (e.g., a second pressure) within the pressure chamber 516 produces a force (e.g., a second force) applied to the piston 510 that is greater than the preload of the actuator 104 (e.g., provided by the spring 514). Thus, the valve positioner 106 and/or the solenoid valve 202 do not move the shutdown valve 102 (FIG. 1) from the closed position when the valve positioner 106 tests the solenoid valve 202.

In some examples, the valve positioner 106 further tests the functionality of the solenoid valve 202 by instructing the solenoid valve 202 to return to the first state (e.g., by permitting power to be supplied to the solenoid valve 202) after a predetermined amount of time (e.g., upon completion of the monitoring period) and subsequently measuring a third pressure of the pressure chamber 516. The valve positioner 106 determines and/or calculates a final change in pressure based on the first pressure and the third pressure. Because the valve positioner 106 provides fluid to the pressure chamber 516 when the solenoid valve 202 is in the third state, the valve positioner 106 detects an increase in pressure when the solenoid valve 202 transitions from the second state to the first state.

The valve positioner 106 may determine that there is an error with the solenoid valve 202 if the final pressure change fails to satisfy (e.g., fails to fall below) a final pressure change threshold (e.g., a reset pressure threshold). Conversely, the valve positioner 106 may determine that the solenoid valve 202 is functioning properly if the final pressure change satisfies (e.g., falls below) the final pressure change threshold (e.g., the reset pressure threshold).

Additionally or alternatively, the valve positioner 106 measures a temperature of the environment during testing of the solenoid valve 202. If the valve positioner 106 determines that the solenoid valve 202 is not functioning properly, the measured temperature may indicate a cause for the error occurring with the solenoid valve 202. For example, the valve positioner 106 measuring a relatively low temperature (e.g., substantially colder than a normal operating temperature) during detection of an error with the solenoid valve 202 indicates that moisture and/or grease within the solenoid valve 202 may have frozen and, thus, prevented the solenoid valve 202 from transitioning between the first state and the second state in a timely manner (e.g., the solenoid valve 202 remains in the second state for too long and/or too short of time relative the pulse duration).

Figure 7:
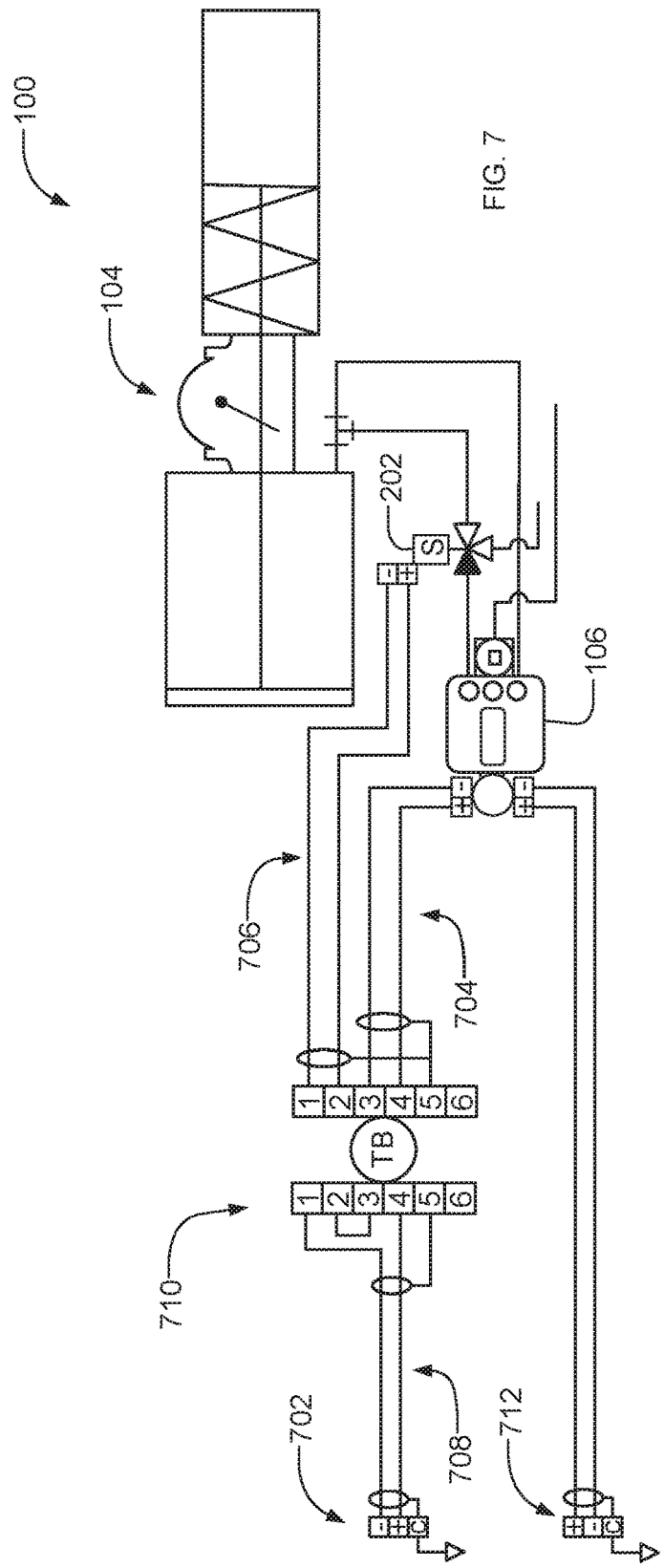
FIG. 7 is an electrical and fluid flow schematic of the actuator, the valve positioner, and the solenoid valve of FIGS. 1-2 in accordance with the teachings of this disclosure.

FIG. 7 depicts an electrical and fluid flow schematic of the emergency system 100 in accordance with the teachings herein when the solenoid valve 202 is in the second state. As illustrated in FIG. 7, the solenoid valve 202 is communicatively coupled to the valve positioner 106 and a first output source 702 via wiring 704, 706, 708. For example, to communicatively couple the solenoid valve 202 and the valve positioner 106, the wiring 704 couples the valve positioner 106 to a terminal block 710 and the wiring 706 couples the terminal block 710 to the solenoid valve 202. Thus, the wiring 704, 706 enables the valve positioner 106 to interrupt and/or permit power to be provided to the solenoid valve 202 to test the functionality of the solenoid valve 202. Further, the wiring 708 couples the first output source 702 to the terminal block 710 to communicatively couple the first output source 702 to the solenoid valve 202. In some examples, the first output source 702 is an output terminal of a controller (e.g., a programmable controller, a programmable logic controller, a logic solver, etc.) that supplies and/or provides power (e.g., via a 24+VDC signal) to the solenoid valve 202 to open the shutdown valve 102 (FIG. 1) and/or terminates power (e.g., via a 0 VDC signal) to close the shutdown valve 102 upon detection of a hazardous and/or dangerous condition. Thus, as illustrated in FIG. 7, the valve positioner 106 is installed to test the solenoid valve 202 without affecting an ability of the solenoid valve 202 to close the shutdown valve 102 upon detection of a hazardous and/or dangerous condition.

As illustrated in FIG. 7, the valve positioner 106 is communicatively coupled to a second output source 712 that sends an input signal (e.g., a 4-20 mA signal) to the valve positioner 106 to control the valve positioner 106. Further, the output source 712 sends a test signal (e.g., via HART communication protocol, PROFIBUS PA, FOUNDATION Fieldbus, etc.) to start a test (e.g., a partial stroke test) of the solenoid valve 202, the actuator 104 and/or the shutdown valve 102. Thus, the valve positioner 106 of the illustrated example tests the functionality of the solenoid valve 202 independently of testing the functionality of the shutdown valve 102 and/or the actuator 104. In some instances, the solenoid valve 202 may be more likely to deteriorate and/or become damaged over time relative the actuator 104 and/or the shutdown valve 102. In such instances, the valve positioner 106 conducts a test of the solenoid valve 202 more frequently (e.g., monthly) than it may conduct a partial stroke test of the shutdown valve 102 (e.g., quarterly, yearly, etc.). Further, in some examples, the valve positioner 106 is scheduled (e.g., programmed) to conduct a partial stroke test of the shutdown valve 102 upon testing the functionality of the solenoid valve 202. In such examples, if the valve positioner 106 identifies an error with and/or a malfunction of the solenoid valve 202, the valve positioner 106 may be programmed to and/or enable an operator to elect to abort or continue with the scheduled partial stroke test.

Figure 8:
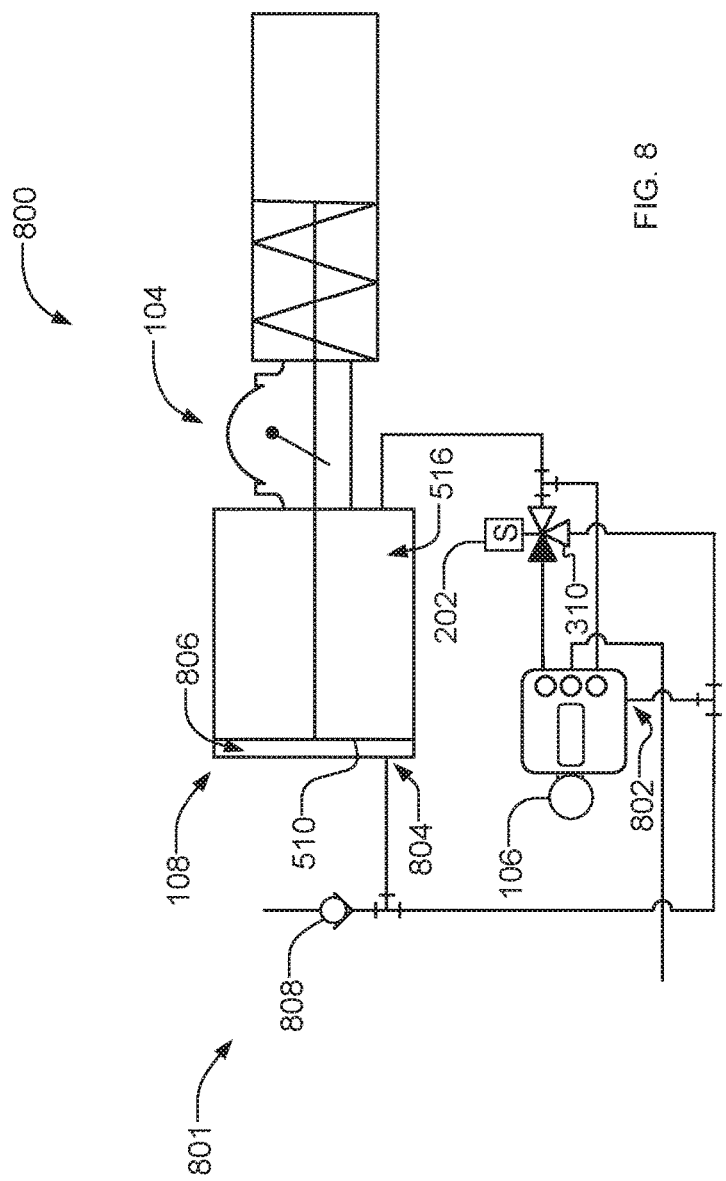
FIG. 8 is another fluid flow schematic of the actuator, the valve positioner, and the solenoid valve of FIGS. 1-2 in the second state in accordance with the teachings of this disclosure.

FIG. 8 depicts a fluid flow schematic of another emergency system 800 that includes the shutdown valve 102 (FIG. 1), the actuator 104, the valve positioner 106, and the solenoid valve 202 when the solenoid valve 202 is in the second state. In the example emergency system 800 of FIG. 8, the valve positioner 106 tests the solenoid valve 202 and the actuator 104 in a manner substantially similar or identical to that of the example emergency system 100 described in FIGS. 5-7. Because those characteristics are described in detail in connection with the emergency system 100 of FIGS. 5-7, those characteristics of the emergency system 800 of FIG. 8 are not described in further detail below.

Further, as illustrated in FIG. 8, the emergency system 800 of the illustrated example incorporates a rebreather system 801 in which the third valve port 310 of the solenoid valve 202, a vent 802 of the valve positioner 106, and a vent 804 of a secondary chamber 806 of the first chamber 108 of the actuator 104 are vented through a check valve 808. The vent 804 of the first chamber 108 prevents a vacuum from forming in the secondary chamber 806 as the piston 510 moves within the first chamber 108 (e.g., in a rightward direction in the illustrated example) to further enable movement of the piston 510 when the pressure within the pressure chamber 516 changes. To prevent the secondary chamber 806 from drawing in polluted air and/or chemicals from the atmosphere, the rebreather system 801 enables the secondary chamber 806 to pull in substantially clean air from the vent 802 of the valve positioner 106 and/or the third valve port 310 of the solenoid valve 202. Further, the check valve 808 maintains a pressure (e.g., approximately 1 pound per square inch) within the rebreather system 801 to enable the secondary chamber 806 to draw the vented air from the vent 802 of the valve positioner 106 and/or the third valve portion 310 of the solenoid valve 202. Thus, the valve positioner 106 is capable of testing the functionality of the solenoid valve 202 when the rebreather system 801 is incorporated into the emergency system 800.

Figure 9:
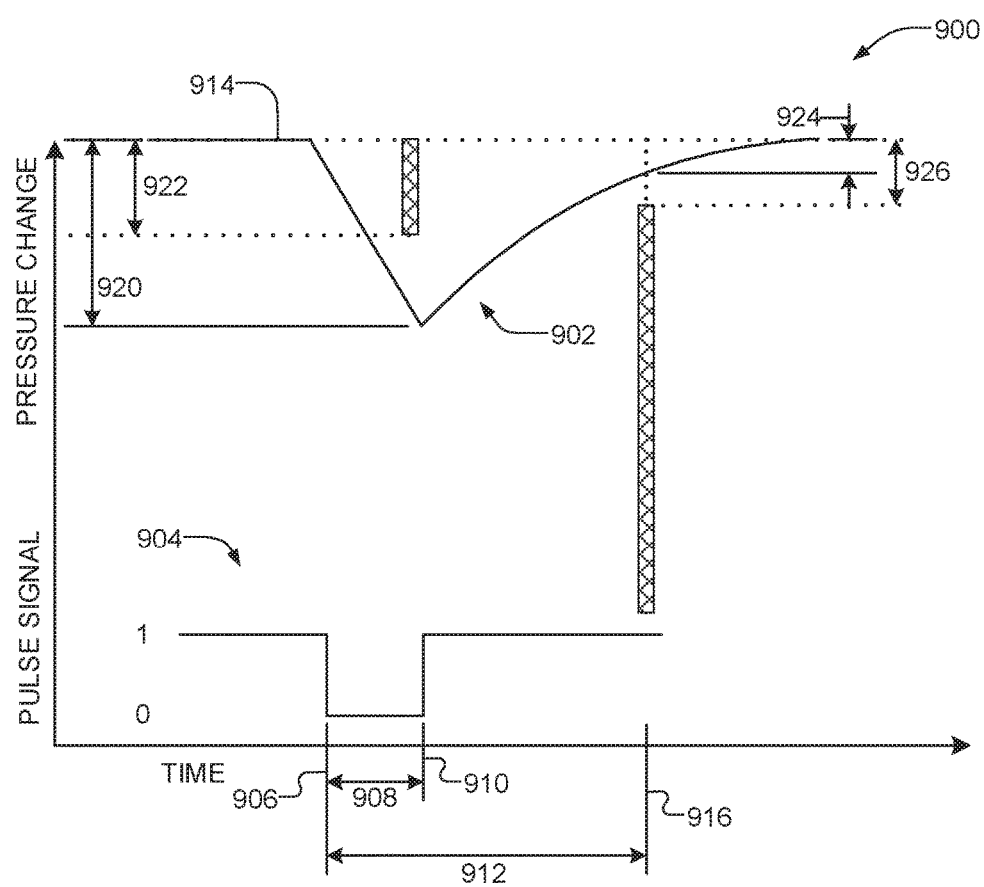
FIG. 9 is a graph depicting an example test of the solenoid valve of FIGS. 2-8 conducted via the valve positioner of FIGS. 1-2 and 5-7.

FIG. 9 is a graph 900 depicting an example test of the example solenoid valve 202 of FIGS. 2-8 conducted via the example valve positioner 106 of FIGS. 1-2 and 5-7. In the illustrated example, a pressure change 902 in the pressure chamber 516 (FIGS. 5-6) of the actuator 104 (FIGS. 1-2 and 5-6) and a pulse signal 904 are plotted in relation to time.

As illustrated in FIG. 9, the pulse signal 904 is sent to transition the solenoid valve 202 from the first state (e.g., an energized state indicated by the value '1' in FIG. 9) to the second state (e.g., a de-energized state indicated by the value '0' in FIG. 9). The pulse signal 904 is sent at the start time 906 and lasts for the pulse duration 908 until the pulse end time 910. Further, the valve positioner 106 monitors the pressure across the solenoid valve 202 for the monitoring duration 912. In the illustrated example, the monitoring duration 912 starts at the start time 906 of the pulse duration 908. For example, the valve positioner 106 measures the initial pressure 914 at the start time 906. In other examples, the monitoring duration 912 may start before the start time 906 of the pulse signal 904 such that the initial pressure 914 is measured before the pulse signal 904 is sent. Further, the monitoring duration 912 extends to the monitoring end time 916. The monitoring duration 912 is greater than the pulse duration 908 such that valve positioner 106 continues to monitor the pressure across solenoid valve 202 after the pulse signal 904 has terminated.

The graph 900 plots the pressure change 902 measured by the valve positioner 106 over time relative to when the valve positioner 106 sends the pulse signal 904 to the solenoid valve 202. For example, the valve positioner 106 determines and/or calculates the pressure change 902 by comparing a measurement of the pressure of the pressure chamber 516 at a particular time to the initial pressure 914. As illustrated in FIG. 9, the valve positioner 106 measures a decrease in pressure upon the valve positioner 106 sending the pulse signal 904 to the solenoid valve 202 and an increase in pressure upon the valve positioner 106 terminating the pulse signal 904. In the illustrated example, the pressure of the pressure chamber 516 begins to decrease approximately at the start time 906 of the pulse signal 904. In other examples, the pressure begins to decrease after the start time 906 due to a delay in communication between the valve positioner 106 and the solenoid valve 202 and/or due to a mechanical and/or electrical delay of the solenoid valve 202 (e.g., a delay in the stem 302 of FIGS. 3 and 4 moving from the first state to the second state). Further, in the illustrated example, the maximum pressure change 920 of the solenoid valve 202 occurs approximately at the pulse end time 910 of the pulse signal 904. In other examples, the maximum pressure change 920 occurs after the pulse signal 904 ends due to a communicative, electrical and/or mechanical delay. For example, an operational delay associated with a shutdown valve may result in the shutdown valve venting for a period of time ending slightly beyond the pulse end time 910 of the pulse signal 904. In such an example, the maximum pressure change 920 may occur at a time corresponding to the end of the venting period of the shutdown valve, as opposed to occurring at the pulse end time 910 of the pulse signal 904. The maximum pressure change 920 may occur at any point in time during the monitoring duration 912 described above.

The graph 900 of the illustrated example of FIG. 9 depicts the pressure change 902 of a functional solenoid valve 202. The graph 900 of FIG. 9 includes an example trip value 922 (e.g., a maximum pressure change threshold) and an example reset value 926 (e.g., a final pressure change threshold). The trip value 922 corresponds to a pressure change that is to be exceeded at a point in time during the monitoring duration 912 in order for the solenoid valve 202 to be determined to be functional. The reset value 926 corresponds to a pressure change that is not to be exceeded at the monitoring end time 916 of the monitoring duration 912 in order for the solenoid valve 202 to be determined to be functional. For example, the reset value 926 may be exceeded in instances where the measured pressure of the solenoid valve 202 has not sufficiently returned to the initial pressure 914 by the monitoring end time 916 of the monitoring duration 912. In the illustrated example of FIG. 9, the solenoid valve 202 is determined to be functional as the maximum pressure change 920 is greater than the trip value 922 (e.g., is greater than the maximum pressure change threshold) and the pressure change 924 at the monitoring end time 916 is less than the reset value 926 (e.g., is less than the final pressure change threshold).

Figure 10:
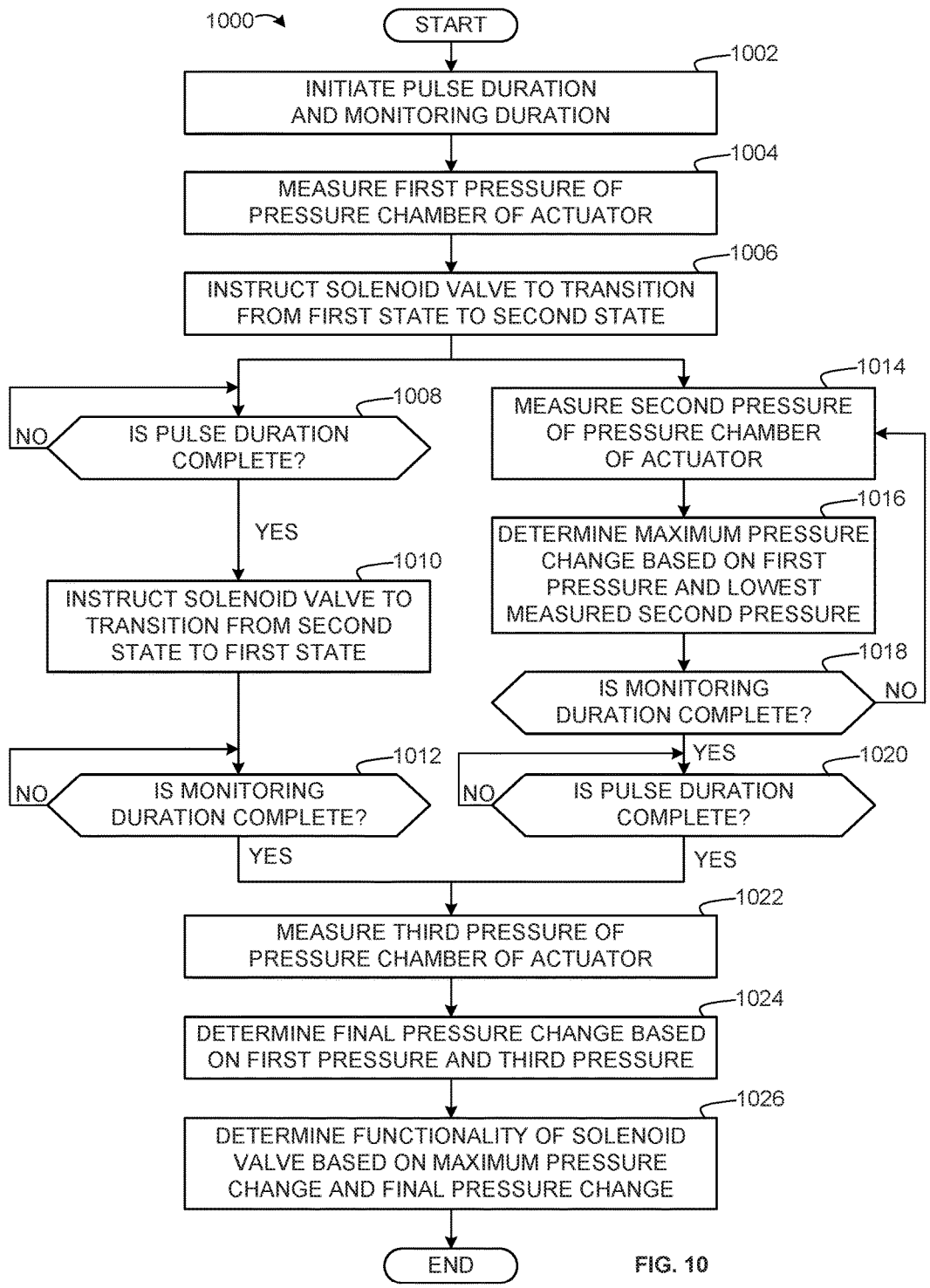
FIG. 10 is a flowchart representative of an example method to test the solenoid valve of FIGS. 2-8 via the valve positioner of FIGS. 1-2 and 5-7 in accordance with the teachings of this disclosure.

FIG. 10 is a flowchart representative of an example method 1000 to test the example solenoid valve 202 of FIGS. 2-8 via the example valve positioner 106 of FIGS. 1-2 and 5-7. Although the example method 1000 is described with reference to the flowchart illustrated in FIG. 10, many other methods of testing the solenoid valve 202 of FIGS. 2-8 via the valve positioner 106 of FIGS. 1-2 and 5-7 may alternatively be used. For example, the order of execution of the blocks may be changed, and/or some of the blocks described changed, eliminated, and/or combined. Further, the blocks of the example method 900 are implemented by executing corresponding instructions (e.g., first instructions, second instructions, third instructions, etc.) via a processor.

The example method 1000 of FIG. 10 is discussed in connection with the solenoid valve 202 of FIGS. 2-8 and the valve positioner 106 of FIGS. 1-2 and 5-7. Components identified in FIGS. 1-8 having functions substantially similar or identical to the functions of components described below will not be described in detail again. Instead, the same reference numbers will be used for like structures.

The example method 1000 of FIG. 10 begins when the example valve positioner 106 of FIGS. 1-2 and 5-7 initiates a pulse duration and a monitoring duration (block 1002). For example, the valve positioner 106 may initiate a pulse duration timer and a monitoring duration timer. Following block 1002, control of the example method 1000 of FIG. 10 proceeds to block 1004.

At block 1004, the example valve positioner 106 of FIGS. 1-2 and 5-7 measures a first pressure of a pressure chamber of an actuator (e.g., the actuator 104 of FIGS. 1-2 and 5-8) in fluid communication with the example solenoid valve 202 of FIGS. 2-8 (block 1004). For example, a pressure port (e.g., the second pressure port 520 of FIGS. 5-6) of the valve positioner 106 may measure the first pressure via a sense line (e.g., the sense line 524 of FIGS. 5-6). Following block 1004, control of the example method 1000 of FIG. 10 proceeds to block 1006.

At block 1006, the example valve positioner 106 of FIGS. 1-2 and 5-7 instructs the example solenoid valve 202 of FIGS. 2-8 to transition from a first state (e.g., an energized state, a normal state) to a second state (e.g., a de-energized state, an emergency state, a trip state) (block 1006). For example, the valve positioner 106 may instruct the solenoid valve 202 to transition from the first state to the second state by interrupting power provided to the solenoid valve 202. Following block 1006, control of the example method 1000 of FIG. 10 proceeds jointly and/or concurrently to blocks 1008 and 1014.

At block 1008, the example valve positioner 106 of FIGS. 1-2 and 5-7 determines whether the pulse duration is complete (block 1008). For example, the valve positioner 106 may determine whether a pulse duration timer has expired. If the valve positioner 106 determines at block 1008 that the pulse duration is not complete, control of the example method 1000 of FIG. 10 remains at block 1008. If the valve positioner 106 instead determines at block 1008 that the pulse duration is complete, control of the example method 1000 of FIG. 10 proceeds to block 1010.

At block 1010, the example valve positioner 106 of FIGS. 1-2 and 5-7 instructs the example solenoid valve 202 of FIGS. 2-8 to transition from a second state (e.g., a de-energized state, an emergency state, a trip state) to a first state (e.g., an energized state, a normal state) (block 1010). For example, the valve positioner 106 may instruct the solenoid valve 202 to transition from the second state to the first state by restoring power to the solenoid valve 202. Following block 1010, control of the example method 1000 of FIG. 10 proceeds to block 1012.

At block 1012, the example valve positioner 106 of FIGS. 1-2 and 5-7 determines whether the monitoring duration is complete (block 1012). For example, the valve positioner 106 may determine whether a monitoring duration timer has expired. If the valve positioner 106 determines at block 1012 that the monitoring duration is not complete, control of the example method 1000 of FIG. 10 remains at block 1012. If the valve positioner 106 instead determines at block 1012 that the monitoring duration is complete, control of the example method 1000 of FIG. 10 proceeds to block 1022.

At block 1014, the example valve positioner 106 of FIGS. 1-2 and 5-7 measures a second pressure of a pressure chamber of an actuator (e.g., the actuator 104 of FIGS. 1-2 and 5-8) in fluid communication with the example solenoid valve 202 of FIGS. 2-8 (block 1014). For example, a pressure port (e.g., the second pressure port 520 of FIGS. 5-6) of the valve positioner 106 may measure the second pressure via a sense line (e.g., the sense line 524 of FIGS. 5-6). Following block 1014, control of the example method 1000 of FIG. 10 proceeds to block 1016.

At block 1016, the example valve positioner 106 of FIGS. 1-2 and 5-7 determines a maximum pressure change based on the first pressure and a lowest measured second pressure (block 1016). For example, the valve positioner 106 may determine the maximum pressure change by comparing the first pressure to what is currently the lowest measured second pressure. If a lower second pressure is subsequently measured by the valve positioner 106 at block 1014 of the example method 1000 of FIG. 10, the valve positioner 106 will utilize the lower (e.g., the lowest) measured second pressure to determine the maximum pressure change at block 1016. Following block 1016, control of the example method 1000 of FIG. 10 proceeds to block 1018.

At block 1018, the example valve positioner 106 of FIGS. 1-2 and 5-7 determines whether the monitoring duration is complete (block 1018). For example, the valve positioner 106 may determine whether a monitoring duration timer has expired. If the valve positioner 106 determines at block 1018 that the monitoring duration is not complete, control of the example method 1000 of FIG. 10 returns to block 1014. If the valve positioner 106 instead determines at block 1018 that the monitoring duration is complete, control of the example method 1000 of FIG. 10 proceeds to block 1020.

At block 1020, the example valve positioner 106 of FIGS. 1-2 and 5-7 determines whether the pulse duration is complete (block 1020). For example, the valve positioner 106 may determine whether a pulse duration timer has expired. If the valve positioner 106 determines at block 1020 that the pulse duration is not complete, control of the example method 1000 of FIG. 10 remains at block 1020. If the valve positioner 106 instead determines at block 1020 that the pulse duration is complete, control of the example method 1000 of FIG. 10 proceeds to block 1022.

At block 1022, the example valve positioner 106 of FIGS. 1-2 and 5-7 measures a third pressure of a pressure chamber of an actuator (e.g., the actuator 104 of FIGS. 1-2 and 5-8) in fluid communication with the example solenoid valve 202 of FIGS. 2-8 (block 1022). For example, a pressure port (e.g., the second pressure port 520 of FIGS. 5-6) of the valve positioner 106 may measure the third pressure via a sense line (e.g., the sense line 524 of FIGS. 5-6). Following block 1022, control of the example method 1000 of FIG. 10 proceeds to block 1024.

At block 1024, the example valve positioner 106 of FIGS. 1-2 and 5-7 determines a final pressure change based on the first pressure and the third pressure (block 1024). For example, the valve positioner 106 may determine the final pressure change by comparing the first pressure to the third pressure. Following block 1024, control of the example method 1000 of FIG. 10 proceeds to block 1026.

At block 1026, the example valve positioner 106 of FIGS. 1-2 and 5-7 determines a functionality of the example solenoid valve 202 of FIGS. 2-8 based on the maximum pressure change and the final pressure change (block 1026). For example, the valve positioner 106 may determines that there is an error with the solenoid valve 202 if the maximum pressure change is a non-negative value (e.g., indicating that the solenoid valve 202 did not change from the first state to the second state when instructed to do so) and/or if the maximum pressure change fails to satisfy (e.g., fails to exceed) a maximum pressure change threshold (e.g., a trip pressure threshold). As another example, the valve positioner 106 may determines that there is an error with the solenoid valve 202 if the final pressure change fails to satisfy (e.g., fails to be less than) a final pressure change threshold (e.g., a reset pressure threshold). Following block 1026, the example method 1000 of FIG. 10 ends.

Figure 11A:
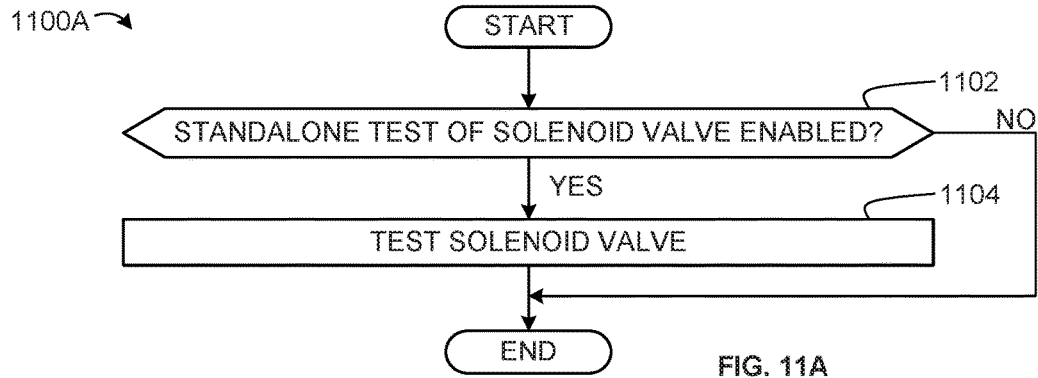
FIG. 11A is a flowchart representative of an example method to conduct an enabled standalone test of the solenoid valve of FIGS. 2-8 via the valve positioner of FIGS. 1-2 and 5-8 in accordance with the teachings of this disclosure.
Figure 11B:
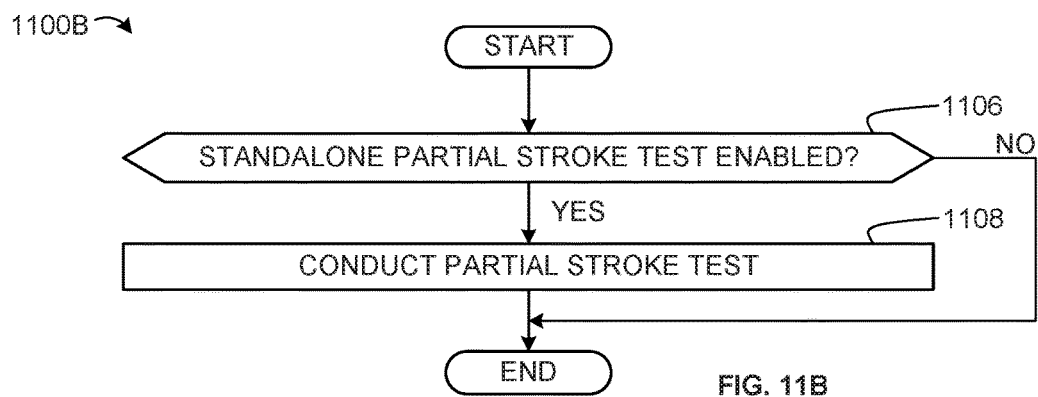
FIG. 11B is a flowchart representative of an example method to conduct an enabled standalone partial stroke test of the shutdown valve of FIG. 1 via the valve positioner of FIGS. 1-2 and 5-8 in accordance with the teachings of this disclosure.
Figure 11C:
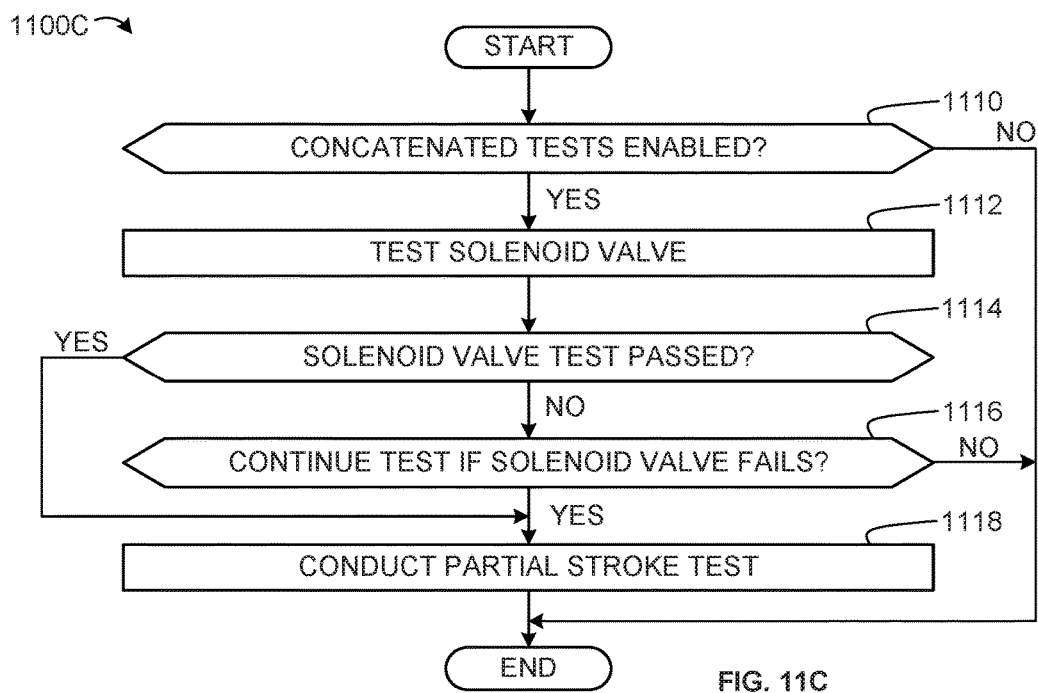
FIG. 11C is a flowchart representative of an example method to conduct enabled concatenated tests of the solenoid valve of FIGS. 2-8 and the shutdown valve of FIG. 1 via the valve positioner of FIGS. 1-2 and 5-8 in accordance with the teachings of this disclosure.

FIG. 11A is a flowchart representative of an example method 1100A to conduct an example enabled standalone test of the example solenoid valve 202 of FIGS. 2-8 via the example valve positioner 106 of FIGS. 1-2 and 5-8. FIG. 11B is a flowchart representative of an example method 1100B to conduct an example enabled standalone partial stroke test of the example shutdown valve 102 of FIG. 1 via the example valve positioner 106 of FIGS. 1-2 and 5-8. FIG. 11C is a flowchart representative of an example method 1100C to conduct example enabled concatenated tests of the example solenoid valve 202 of FIGS. 2-8 and the example shutdown valve 102 of FIG. 1 via the example valve positioner 106 of FIGS. 1-2 and 5-8. The example method 1100A of FIG. 11A, the example method 1100B of FIG. 11B, and the example method 1100C of FIG. 11C may be initiated at any time and in any sequence relative to one another. Although the example methods 1100A, 1100B and 1100C are described with reference to corresponding ones of the flowcharts illustrated in FIGS. 11A, 11B and 11C, many other methods of conducting an enabled standalone test of the solenoid valve 202 of FIGS. 2-8 via the valve positioner 106 of FIGS. 1-2 and 5-8, conducting an enabled standalone partial stroke test of the shutdown valve 102 of FIG. 1 via the valve positioner 106 of FIGS. 1-2 and 5-8, and/or conducting enabled concatenated tests of the solenoid valve 202 of FIGS. 2-8 and the shutdown valve 102 of FIG. 1 via the valve positioner 106 of FIGS. 1-2 and 5-8 may alternatively be used. For example, the order of execution of the blocks may be changed, and/or some of the blocks described changed, eliminated, and/or combined. Further, the blocks of the example methods 1100A, 1100B and 1100C are implemented by executing corresponding instructions (e.g., first instructions, second instructions, third instructions, etc.) via a processor.

The example methods 1100A, 1100B and 1100C are discussed in connection with the example solenoid valve 202 of FIGS. 2-8, the example shutdown valve 102 of FIG. 1, and the example valve positioner 106 of FIGS. 1-2 and 5-8. Components identified in FIGS. 1-8 having functions substantially similar or identical to the functions of components described below will not be described in detail again. Instead, the same reference numbers will be used for like structures.

The example method 1100A of FIG. 11A begins when the example valve positioner 106 of FIGS. 1-2 and 5-8 determines whether a standalone test of the example solenoid valve 202 of FIGS. 2-8 is enabled (block 1102). If the valve positioner 106 determines at block 1102 that a standalone test of the solenoid valve 202 is enabled, control of the example method 1100A of FIG. 11A proceeds to block 1104. If the valve positioner 106 instead determines at block 1102 that a standalone test of the solenoid valve 202 is not enabled, the example method 1100A of FIG. 11A ends.

At block 1104, the example valve positioner 106 of FIGS. 1-2 and 5-8 conducts a test of the example solenoid valve 202 of FIGS. 1-2 and 5-8 (block 1104). Following block 1104, the example method 1100A of FIG. 11A ends.

The example method 1100B of FIG. 11B begins when the example valve positioner 106 of FIGS. 1-2 and 5-8 determines whether a standalone partial stroke test of the example shutdown valve 102 of FIG. 1 is enabled (block 1106). If the valve positioner 106 determines at block 1106 that a standalone partial stroke test of the shutdown valve 102 is enabled, control of the example method 1100B of FIG. 11B proceeds to block 1108. If the valve positioner 106 instead determines at block 1106 that a standalone partial stroke test of the shutdown valve 102 is not enabled, the example method 1100B of FIG. 11B ends.

At block 1108, the example valve positioner 106 of FIGS. 1-2 and 5-8 conducts a partial stroke test of the example shutdown valve 102 of FIG. 1 (block 1108). Following block 1108, the example method 1100B of FIG. 11B ends.

The example method 1100C of FIG. 11C begins when the example valve positioner 106 of FIGS. 1-2 and 5-8 determines whether concatenated tests of the example solenoid valve 202 of FIGS. 2-8 and the example shutdown valve 102 of FIG. 1 are enabled (block 1110). If the valve positioner 106 determines at block 1110 that concatenated tests of the solenoid valve 202 and the shutdown valve 102 are enabled, control of the example method 1100C of FIG. 11C proceeds to block 1112. If the valve positioner 106 instead determines at block 1110 that concatenated tests of the solenoid valve 202 and the shutdown valve 102 are not enabled, the example method 1100C of FIG. 11C ends.

At block 1112, the example valve positioner 106 of FIGS. 1-2 and 5-8 conducts a test of the example solenoid valve 202 of FIGS. 1-2 and 5-8 (block 1112). Following block 1112, control of the example method 1100C of FIG. 11C proceeds to block 1114.

At block 1114, the example valve positioner 106 of FIGS. 1-2 and 5-8 determines whether the example solenoid valve 202 of FIGS. 2-8 passed the solenoid valve test (block 1114). If the valve positioner 106 determines at block 1114 that the solenoid valve 202 did not pass the solenoid valve test, control of the example method 1100C of FIG. 11C proceeds to block 1116. If the valve positioner 106 instead determines at block 1114 that the solenoid valve 202 passed the solenoid valve test, control of the example method 1100C of FIG. 11C proceeds to block 1118.

At block 1116, the example valve positioner 106 of FIGS. 1-2 and 5-8 determines whether the enabled concatenated tests are to continue if the example solenoid valve 202 of FIGS. 2-8 fails the solenoid valve test (block 1116). If the valve positioner 106 determines at block 1116 that the concatenated tests are to continue if the solenoid valve 202 fails the solenoid valve test, control of the example method 1100C of FIG. 11C proceeds to block 1118. If the valve positioner 106 instead determines at block 1116 that the concatenated tests are not to continue if the solenoid valve 202 fails the solenoid valve test, the example method 1100C of FIG. 11C ends.

At block 1118, the example valve positioner 106 of FIGS. 1-2 and 5-8 conducts a partial stroke test of the example shutdown valve 102 of FIG. 1 (block 1118). Following block 1118, the example method 1100C of FIG. 11C ends.

FIG. 12 depicts a list 1200 of valid configurations and/or tests that the valve positioner 106 is able to conduct for the solenoid valve 202 (FIG. 2-7) and/or the shutdown valve 102 (FIG. 1). For example, the list depicts how individual (e.g., standalone) tests of the solenoid valve 202 and/or the shutdown valve 102 may be conducted in relation with a concatenated test in which the valve positioner 106 is to automatically conduct a partial stroke test of the shutdown valve 102 upon completing the test of the solenoid valve 202. In the illustrated example, a first set of tests 1202 include neither an individual test of the solenoid valve 202 nor an individual partial stroke test of the shutdown valve 102 such that no individual tests are conducted. As illustrated in FIG. 12, if the valve positioner 106 is to stop the partial stroke test upon detecting an error with the solenoid valve 202, the concatenated test is terminated prior to conducting the partial stroke test. If the valve positioner 106 is to continue with the partial stroke test upon detecting an error with the solenoid valve 202, the concatenated test conducts the partial stroke test regardless of the determined functionality of the solenoid valve 202. Further, FIG. 12 depicts a second set of tests 1204 in which an individual test of the solenoid valve 202 is to be conducted with or without a concatenated test, a third set of tests 1206 in which an individual partial stroke test of the shutdown valve 102 is to be conducted with or without a concatenated test, and a fourth set of tests 1208 in which individual tests of the solenoid valve 202 and the shutdown valve 102 are to be conducted with or without a concatenated test.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents. For example, although the teachings of this disclosure are made with specific reference to testing a solenoid valve and/or a shutdown valve via a valve positioner, the disclosed testing may alternatively be controlled, managed and/or performed by a smart solenoid valve.

What is claimed is:

1. A method comprising:
conducting a solenoid valve test of a solenoid valve via a valve positioner without actuating an emergency valve during the solenoid valve test, the emergency valve being operatively coupled to an actuator in fluid communication with the solenoid valve, the conducting of the solenoid valve test including:

initiating, by executing first instructions via a processor of the valve positioner, a pulse duration and a monitoring duration for the solenoid valve test;

instructing, by executing second instructions via the processor, the solenoid valve to transition from a first state to a second state during the pulse duration; and determining, by executing third instructions via the processor, a functionality of the solenoid valve by measuring, via the valve positioner, a maximum pressure change of a pressure chamber of the actuator during the monitoring duration; and conducting a partial stroke test of the emergency valve via the valve positioner following completion of the solenoid valve test and in response to determining that the solenoid valve is in a functioning state.

2. The method of claim 1, wherein instructing the solenoid valve to transition to the second state includes interrupting, via the valve positioner, power provided to the solenoid valve.

3. The method of claim 1, further including conducting the partial stroke test of the emergency valve via the valve positioner in response to determining that the solenoid valve is in an error state.

4. The method of claim 1, further including aborting the partial stroke test of the emergency valve via the valve positioner in response to determining that the solenoid valve is in an error state.

5. The method of claim 1, further including conducting a second solenoid valve test of the solenoid valve via the valve positioner without first conducting a second partial stroke test of the emergency valve.

6. The method of claim 1, further including conducting a second partial stroke test of the emergency valve without first conducting a second solenoid valve test.

7. The method of claim 1, wherein measuring the maximum pressure change includes:
measuring a first pressure of the pressure chamber prior to instructing the solenoid valve to transition to the second state;
measuring a lowest second pressure of the pressure chamber during the monitoring duration; and
comparing the first pressure and the lowest second pressure.

8. The method of claim 1, wherein determining the functionality of the solenoid valve further includes measuring, via the valve positioner, a final pressure change of the pressure chamber of the actuator.

9. The method of claim 8, wherein measuring the final pressure change includes:
instructing the solenoid valve to return to the first state upon completion of the pulse duration;
measuring a third pressure of the pressure chamber upon completion of the monitoring duration; and
comparing the first pressure and the third pressure.

10. The method of claim 8, wherein determining the solenoid valve is in the functioning state is based on the maximum pressure change and the final pressure change of the pressure chamber of the actuator.

11. The method of claim 1, further including, upon determining the solenoid valve is in the functioning state, identifying that the partial stroke test of the emergency valve is to be conducted.

12. An apparatus comprising:
a solenoid valve in fluid communication with a pressure chamber of an actuator, the actuator being operatively coupled to an emergency valve, the solenoid valve having a first state and a second state; and a valve positioner to conduct a solenoid valve test of the solenoid valve without actuating the emergency valve during the solenoid valve test, the valve positioner, as part of the solenoid valve test, to:
initiate a pulse duration and a monitoring duration for the solenoid valve test;
instruct the solenoid valve to transition from the first state to the second state during the pulse duration; and
determine a functionality of the solenoid valve by measuring a maximum pressure change of the pressure chamber of the actuator during the monitoring duration;
wherein the valve positioner is to conduct a partial stroke test of the emergency valve following completion of the solenoid valve test and in response to the valve positioner determining that the solenoid valve is in a functioning state.

13. The apparatus of claim 12, wherein the valve positioner is to abort the partial stroke test in response to the valve positioner determining that the solenoid valve is in an error state.

14. The apparatus of claim 12, wherein the valve positioner includes a first pressure port in fluid communication with a first valve port of the solenoid valve and a second pressure port in fluid communication with a sense line that measures the maximum pressure change of the pressure chamber.

15. The apparatus of claim 14, wherein the solenoid valve includes a third valve port in fluid communication with a vent.

16. The apparatus of claim 12, wherein the valve positioner is coupled to the solenoid valve via wiring to enable the valve positioner to interrupt power provided to the solenoid valve to instruct the solenoid valve to transition to the second state.

17. The apparatus of claim 12, further including a control panel that enables initiation of at least one of determining the functionality of the solenoid valve or the partial stroke test of the emergency valve.

18. The apparatus of claim 12, wherein the valve positioner is further to conduct a second solenoid valve test of the solenoid valve without first conducting a second partial stroke test of the emergency valve.

19. The apparatus of claim 12, wherein the valve positioner is further to conduct a second partial stroke test of the emergency valve without first conducting a second solenoid valve test.

20. An apparatus comprising:
means for actuating an actuator, the means for actuating the actuator being in fluid communication with a pressure chamber of the actuator, the actuator being operatively coupled to an emergency valve, the means for actuating the actuator having a first state and a second state; and means for positioning, the means for positioning to conduct a solenoid valve test of the means for actuating the actuator without actuating the emergency valve during the solenoid valve test, the means for positioning, as part of the solenoid valve test, to:
initiate a pulse duration and a monitoring duration for the solenoid valve test
instruct the means for actuating the actuator to transition from the first state to the second state during the pulse duration; and determine a functionality of the means for actuating the actuator by measuring a maximum pressure change of the pressure chamber of the actuator during the monitoring duration;

wherein the means for positioning is to further conduct a partial stroke test of the emergency valve following completion of the solenoid valve test and in response to the means for positioning determining that the means for actuating the actuator is in a functioning state.

21. A method comprising:

conducting a solenoid valve test by:
- initiating, by executing first instructions via a processor, a pulse duration and a monitoring duration for the solenoid valve test;
- instructing, by executing second instructions via the processor, a solenoid valve to transition from a first state to a second state during the pulse duration; and
- determining, by executing third instructions via the processor, a functionality of the solenoid valve by measuring, via a valve positioner, a maximum pressure change of a pressure chamber of the actuator during the monitoring duration;

upon determining the solenoid valve is in a functioning state, conducting, by executing fourth instructions via the processor, a partial stroke test of the emergency valve via the valve positioner; and upon determining the solenoid valve is in an error state, conducting, by executing fifth instructions via the processor, a partial stroke test of the emergency valve via the valve positioner.

* * * * *